(12) United States Patent
Kim

(10) Patent No.: US 8,491,786 B2
(45) Date of Patent: Jul. 23, 2013

(54) CIRCULATION TYPE WATER PURIFIER

(75) Inventor: Jaekyeong Kim, Incheon (KR)

(73) Assignee: Dongyang Electronics Co., Ltd., Bucheon, Gyeongki-Do (KR)

(*) Notice: Subject to any disclaimer, the term of this patent is extended or adjusted under 35 U.S.C. 154(b) by 611 days.

(21) Appl. No.: 12/808,531

(22) PCT Filed: Nov. 13, 2008

(86) PCT No.: PCT/KR2008/006681
§ 371 (c)(1),
(2), (4) Date: Jun. 16, 2010

(87) PCT Pub. No.: WO2009/064119
PCT Pub. Date: May 22, 2009

(65) Prior Publication Data
US 2011/0120921 A1 May 26, 2011

(30) Foreign Application Priority Data
Nov. 13, 2007 (KR) .................. 10-2007-0115413

(51) Int. Cl.
*B01D 35/00* (2006.01)
(52) U.S. Cl.
USPC ......... 210/104; 210/109; 210/181; 210/195.1
(58) Field of Classification Search
USPC ........... 210/257.1, 259, 260, 196, 194, 195.1, 210/195.2, 167.01, 175, 181, 182, 106, 97, 210/104, 138, 143, 109
See application file for complete search history.

(56) References Cited

U.S. PATENT DOCUMENTS

| 5,384,032 A | 1/1995 | de Souza | |
|---|---|---|---|
| 6,146,524 A * | 11/2000 | Story | 210/199 |
| 2009/0134080 A1 * | 5/2009 | Fabig | 210/137 |

FOREIGN PATENT DOCUMENTS

| JP | 1-194990 A | 8/1989 |
|---|---|---|
| KR | 2003-0034742 A | 5/2003 |
| KR | 100458603 A | 7/2004 |
| KR | 10-0657766 B1 | 12/2006 |

* cited by examiner

*Primary Examiner* — Terry Cecil
(74) *Attorney, Agent, or Firm* — Edwards Wildman Palmer LLP

(57) ABSTRACT

A circulation type water purifier prevents production of bacteria and microbes by periodically circulating water and also increases pump life and reduces pump costs by varying circulation times depending on an amount of water used. The purifier includes a filter 100; a purified water storage tank 200; a cold/hot water supply tank 300 having respective outlets for hot and cold water and drain outlets; a sterilizer 900; and a pump 400. Under control of a microcomputer, the pump periodically circulates water through various circulation piping.

7 Claims, 15 Drawing Sheets

CIRCULATION TYPE WATER PURIFIER

CROSS-REFERENCE TO RELATED APPLICATIONS

This application is a U.S. national phase application, pursuant to 35 U.S.C. §371 of PCT/KR2008/006681, filed Nov. 13, 2008, designating the United States, which claims priority Korean Application No. 10-2007-0115413, filed Nov. 13, 2007. The entire contents of the aforementioned patent applications are incorporated herein by this reference.

TECHNICAL FIELD

The present invention relates to a circulation type water purifier, and more particularly, to a circulation type water purifier which maximally prevents production of bacteria and microbes and formation of slime and biofilm by periodically circulating water in the water purifier, and improves efficiency and power saving of a pump by varying the number of circulation times depending on an amount of water used.

BACKGROUND ART

In general, water purifiers are classified into an air collection type water purifier used by collecting moisture from the air, a faucet direct-connection type water purifier connected to a waterworks pipe, and a spring water supply type water purifier used by directly supplying purified water thereto. Such purifiers are selectively used depending on conditions of a place and require continuous maintenance so that a user drinks sanitized water in contaminated environment.

A method of periodically cleaning the interior of a water purifier or circulating water is used to solve such a problem. In case of a cold/hot water purifier, its interior is cleaned by cleansing only the interiors of a storage tank for supplying cold/hot water and cold/hot water supply tanks or by periodically replacing filters. However, since only the cleansing of the interiors of the storage tank and the cold/hot water supply tanks and the replacement of filters are performed, problems for sanitary reasons with respect to connection pipes and other parts in the water purifier still remain.

Therefore, although the cleansing of the interiors of the storage tank and the cold/hot water supply tanks is finished, water inside the water purifier is again circulated along the connection pipes, and pollutants are flowed into the interiors of the storage tank and the cold/hot water supply tanks. Accordingly, the water is exposed to the pollutants as it is. Further, although the filters are periodically replaced, the pollutants are not removed without cleansing or replacing a connection pipe to the storage tank in which water is stored from the filters and other connection pipes. Furthermore, problems of cost and maintenance are proposed to solve them.

In addition, if a certain time (three hours) elapses in the state that clean water does not flow but remain inside the water purifier, bacteria (hereinafter, referred to as "microbes") harmful to human bodies are reproduced, and the number of microbes increases by geometric progression.

That is, in case of the faucet direct-connection type water purifier, a chloride contents are added into tap water initially supplied to the interior of the water purifier so that microbes are not produced. However, while the tap water passes through the filters of the water purifier, the chloride contents are filtered and purified. Therefore, if the purified water is not flowed but left for a certain period of time, the number of microbes exceeds a permissible level while the microbes are reproduced. Further, if water does not flow but remain in the filters for a certain period of time, biofilm is formed in a filter film. Particularly, at night when the water purifier is less used, the number of microbes increases by geometric progression after a certain period of time elapses. Therefore, the filters mainly cause pollution of the water purifier.

The pollution of the water purifier results in a problem for sanitary reasons. A method of circulating water is proposed to solve such a problem. However, a water level sensor is placed in a water tank in which water is temporarily stored. Here, the water level sensor senses a level of water and allows water to be circulated when the level of water reaches a predetermined level. Accordingly, the water tank and the water level sensor are additionally installed in the water purifier.

However, it is difficult that a water level sensor is normally operated due to vibrations of water at a place such as a vessel, and an overload is applied to a circulation pump for circulating water due to malfunction of the sensor. Further, since an installation space of the water tank is additionally provided, space utilization is lowered.

In the conventional water purifier, a fundamental solution is required in providing optimum drinking water.

DISCLOSURE

Technical Problem

The present invention provides a circulation type purifier which prevents production of microbes by periodically circulating water in the water purifier and provides optimum drinking water.

The present invention also provides a circulation type purifier which extends lifetime of a pump by varying a circulation period of water inside the water purifier and improves power saving of the pump by controlling the number of operation times of the pump based on an amount of water used.

The present invention also provides a circulation type purifier wherein a sensor for sensing an amount of water used is installed in an outlet of a cold/hot water supply tank, and information on the amount of water used is transferred to a microcomputer, so that the number of operation times of the pump is controlled based on the information.

The present invention also provides a circulation type purifier which improves space utilization inside the water purifier by removing a conventional water tank.

Technical Solution

In an aspect, there is provided a circulation type purifier which includes a clean water filter; a storage tank in which water purified through the clean water filter is stored; a cold/hot water supply tank cooling and heating the water supplied from the storage tank to drain the cooled and heated water to respective drain outlets; a drain pipe 351 connected to the cold/hot water supply tank to drain the water in the cold/hot water supply tank when cleansing the interior of the cold/hot water supply tank; a pump 400 periodically circulating water at every circulation time under a control of a microcomputer; a circulation pipe connecting the clean water filter, the storage tank, the cold/hot water supply tank, the drain pipe and the pump, the circulation pipe including a first circulation pipe connecting the clean water filter and the storage tank, a first auxiliary circulation pipe connecting the storage tank and the cold/hot water supply tank, a second circulation pipe connecting the storage tank and the clean water filter, and a second auxiliary circulation pipe connecting the cold/hot water supply tank and the second circulation pipe; and a sterilizer installed to the circulation pipe to sterilize water flowed into the circulation pipe.

The storage tank may further include a water level sensor, and the water level sensor may interrupt the supply of water into the storage tank when the water in the storage tank reaches a predetermined water level.

The cold/hot water supply tank may further include a cold water supply tank cooling the water supplied from the storage tank and then draining the cooled water to a cold water outlet; a hot water supply tank heating the water supplied from the storage tank and then draining the heated water to a hot water outlet; and sensors sensing an amount of water drained through each of the cold and hot water outlets of the cold/hot water supply tank.

The cold water supply tank may further include an auxiliary cold water supply tank so that the water in the cold water supply tank and the auxiliary cold water supply tank is alternately circulated.

The pump may be operated at least once to 36 times for three hours.

The second auxiliary circulation pipe may include a third auxiliary connection pipe connecting the cold water outlet and the second circulation pipe; a fourth auxiliary connection pipe connecting the hot water outlet and the second circulation pipe; and a fifth auxiliary connection pipe connecting the drain pipe 351 and the second circulation pipe.

The sterilizer may include any one of a UV sterilizer, a far-infrared sterilizer, a silver nano sterilizer, an ozone sterilizer and a photocatalytic sterilizer, and at least one or more sterilizers may be installed to the circulation pipe and the drain pipe so that water passing through the circulation pipe and the drain pipe is sterilized.

The interiors of the storage tank, the cold/hot water supply tank, the circulation pipe and the drain pipe may be coated with an antibiotic material made of any one of silver, carbon, copper, stainless steel and titanium dioxide or a mixture including two or more of them.

Advantageous Effects

As described above, according to the present invention, water is circulated by allowing a pump to be operated by a microcomputer depending on the amount of water used if necessary, so that power consumption can be saved, and accordingly, the lifetime of the pump can be extended. Since biofilm is not formed in a clean water filter while water is periodically circulated, a period of replacing filters can be extended, and accordingly, the maintenance cost of the water purifier can be saved. Since a water tank is not separately installed, space utilization can be improved.

DESCRIPTION OF DRAWINGS

Description will now be made in detail with reference to certain example embodiments illustrated in the accompanying drawings which are given hereinbelow by way of illustration only, and thus are not limitative of the present invention, and wherein.

EXPLANATION OF REFERENCE NUMERALS FOR MAJOR PORTIONS SHOWN IN DRAWINGS

Figure 1:
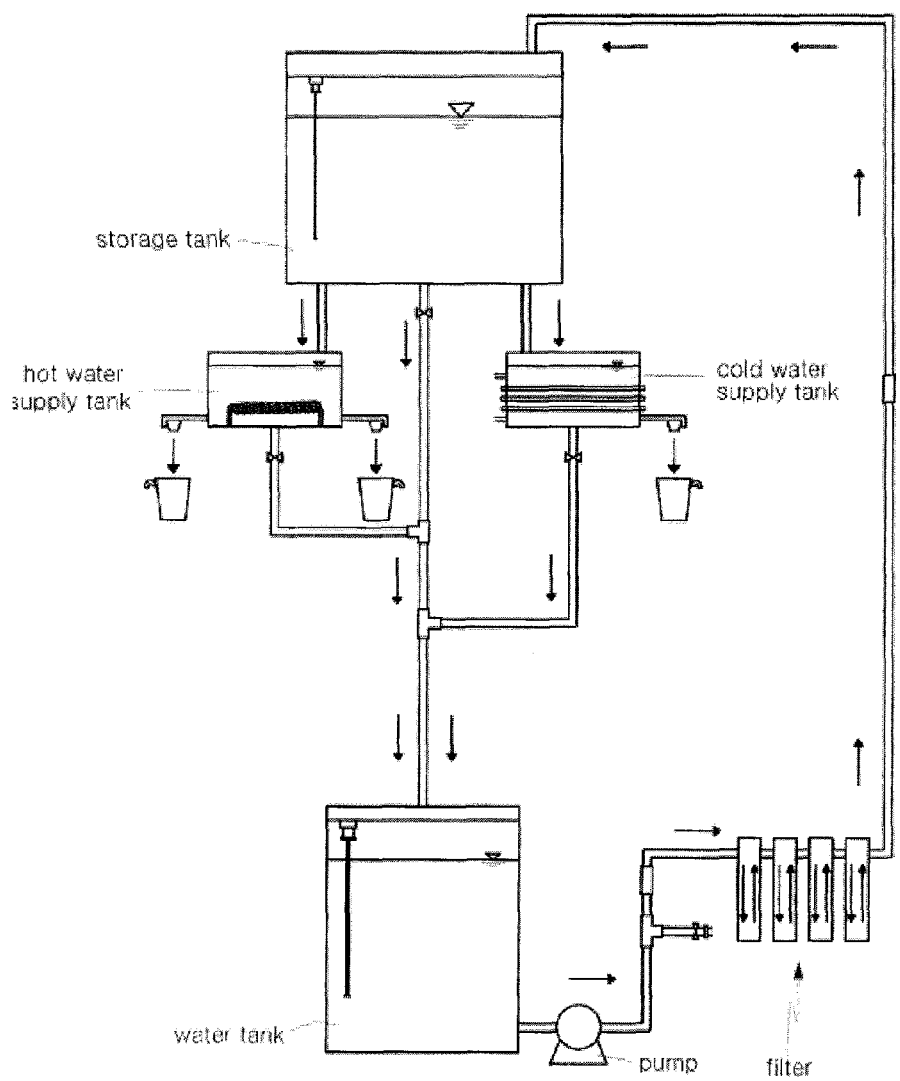
FIG. 1 is a view of a conventional circulation type water purifier.

| | |
|---|---|
| 100: clean water filter | 200: storage tank |
| 211: water level sensor | 221: storage tank valve |
| 230: first auxiliary circulation pipe | |
| 231a, 231b: first auxiliary connection pipes | |
| 232: first auxiliary water supply connection pipe | |
| 233: second auxiliary water supply connection pipe | |
| 235: second auxiliary connection line | |
| 241: cold water open/close valve | |
| 251: hot water open/close valve | 300: cold/hot water supply tank |
| 301: cold water supply tank | |
| 301': auxiliary cold water supply pipe | |
| 302: hot water supply tank | 304: first open/close valve |
| 305: second open/close valve | 306: third open/close valve |
| 307: fourth open/close valve | 308: fifth open/close valve |
| 309: sixth open/close valve | 310: seventh open/close valve |
| 311: cold water outlet | 321: hot water outlet |
| 331: sensor | 341: sensor |
| 351: drain pipe | 361: drain valve |
| 391: open/close valve | 400: pump |
| 500: first circulation pipe | 600: second circulation pipe |
| 700: second auxiliary circulation pipe | |
| 711: third auxiliary connection pipe | |
| 721: fourth auxiliary connection pipe | |
| 731: fifth auxiliary connection pipe | |

| | |
|---|---|
| 800: faucet direct-connection pipe | 811: main valve |
| 821: backwater valve | 900: sterilizer |
| MP: microcomputer | |
| 230, 231a, 231b, 232, 233, 235, 500, 600, 700, 711, 721, 731: circulation pipes | |

It should be understood that the appended drawings are not necessarily to scale, presenting a somewhat simplified representation of various preferred features illustrative of the basic principles. The specific design features as disclosed herein, including, for example, specific dimensions, orientations, locations, and shapes will be determined in part by the particular intended application and use environment.

In the figures, reference numbers refer to the same or equivalent parts thought the figures of the drawing.

Best Mode

Hereinafter, reference will now be made in detail to various embodiments of the present invention, examples of which are illustrated in the accompanying drawings and described below. While the invention will be described in conjunction with example embodiments, it will be understood that the present description is not intended to limit the present invention to those example embodiments. On the contrary, the present invention is intended to cover not only the example embodiments, but also various alternatives, modifications, equivalents and other embodiments, which may be included within the spirit and scope as defined by the appended claims.

Figure 2:
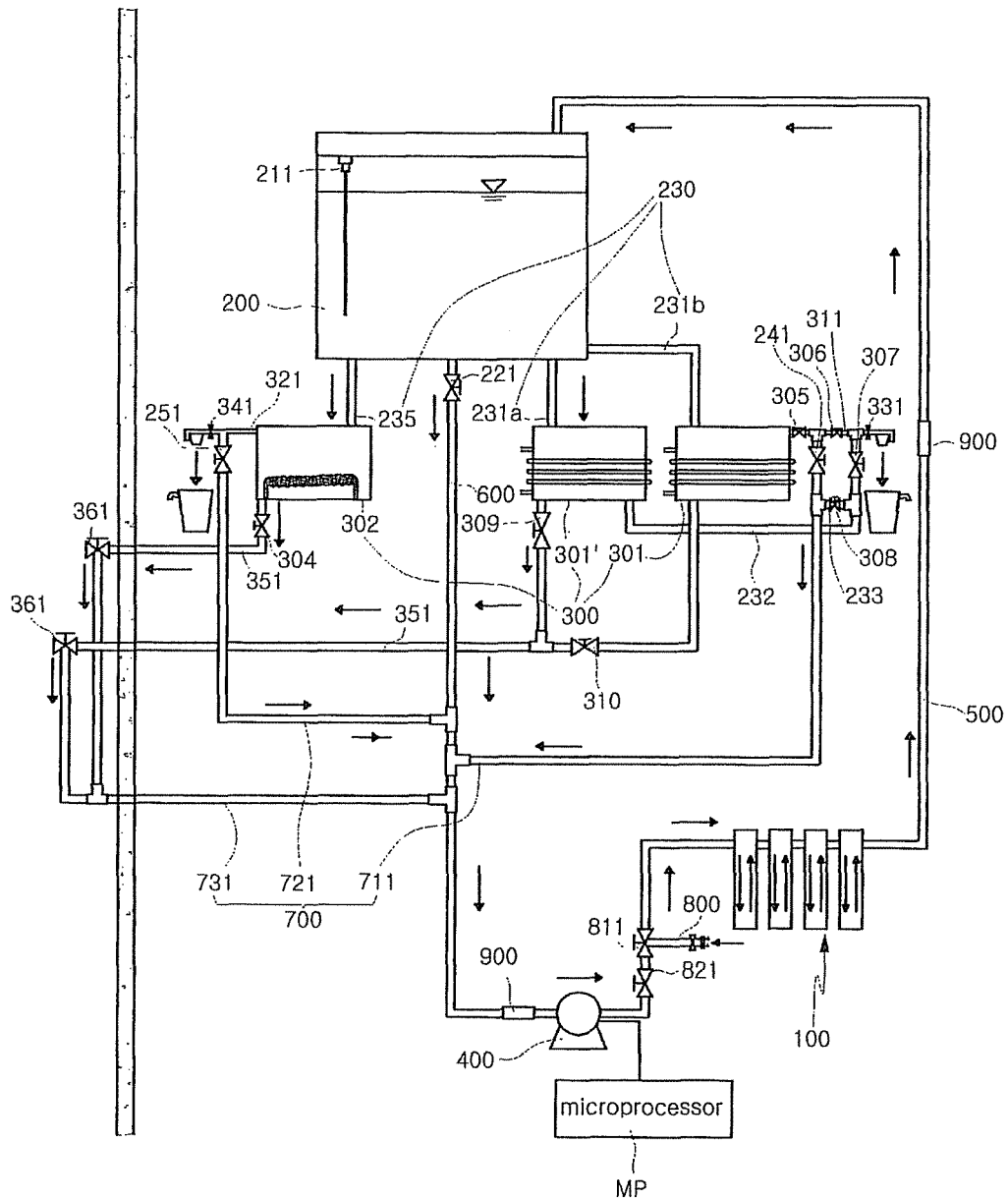
FIG. 2 is a view of a circulation type water purifier applied to a faucet direct-connection type according to an embodiment of the present invention.
Figure 3:
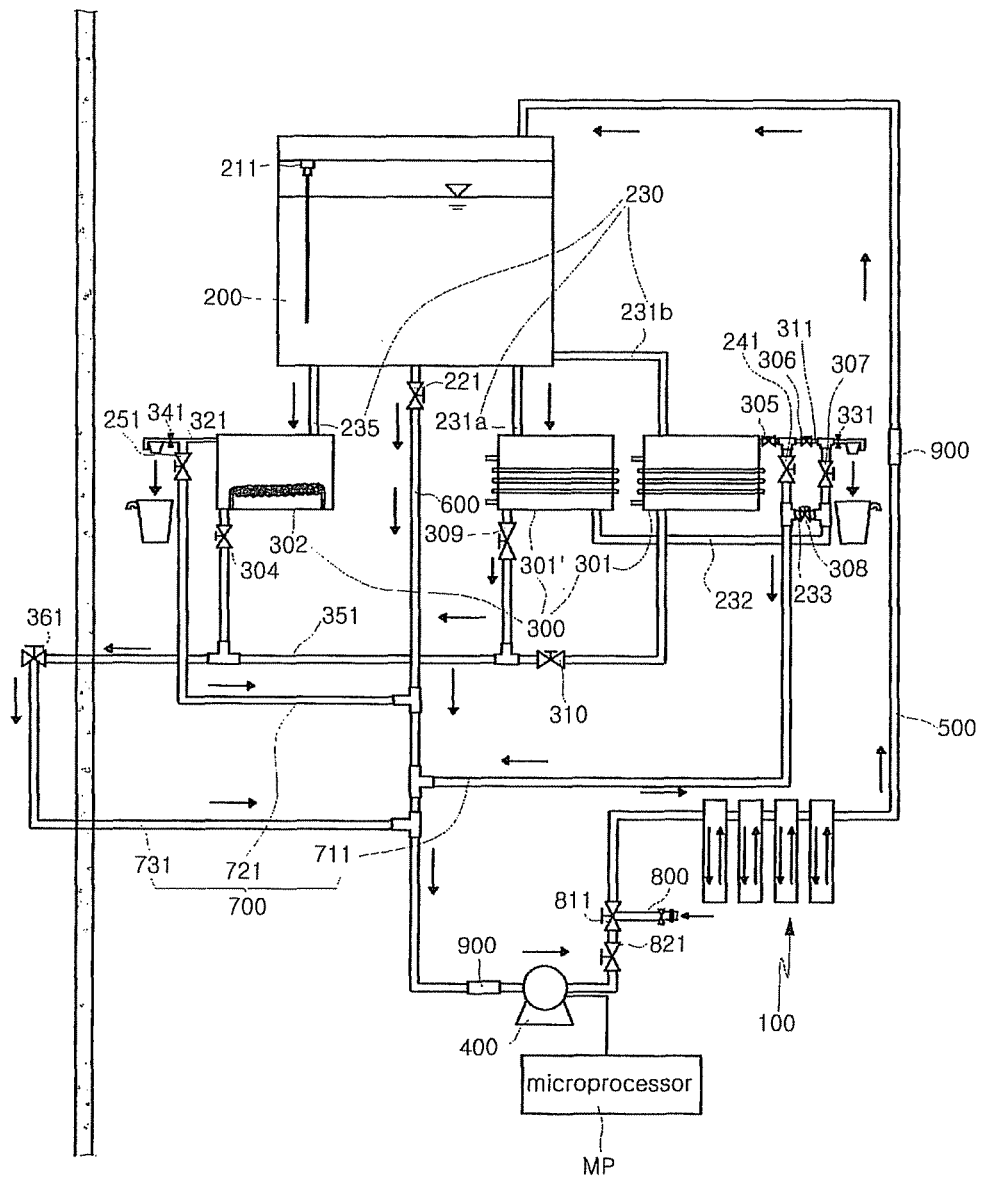
FIG. 3 is a view of the circulation type water purifier applied to another faucet direct-connection type according to the embodiment of the present invention.
Figure 4:
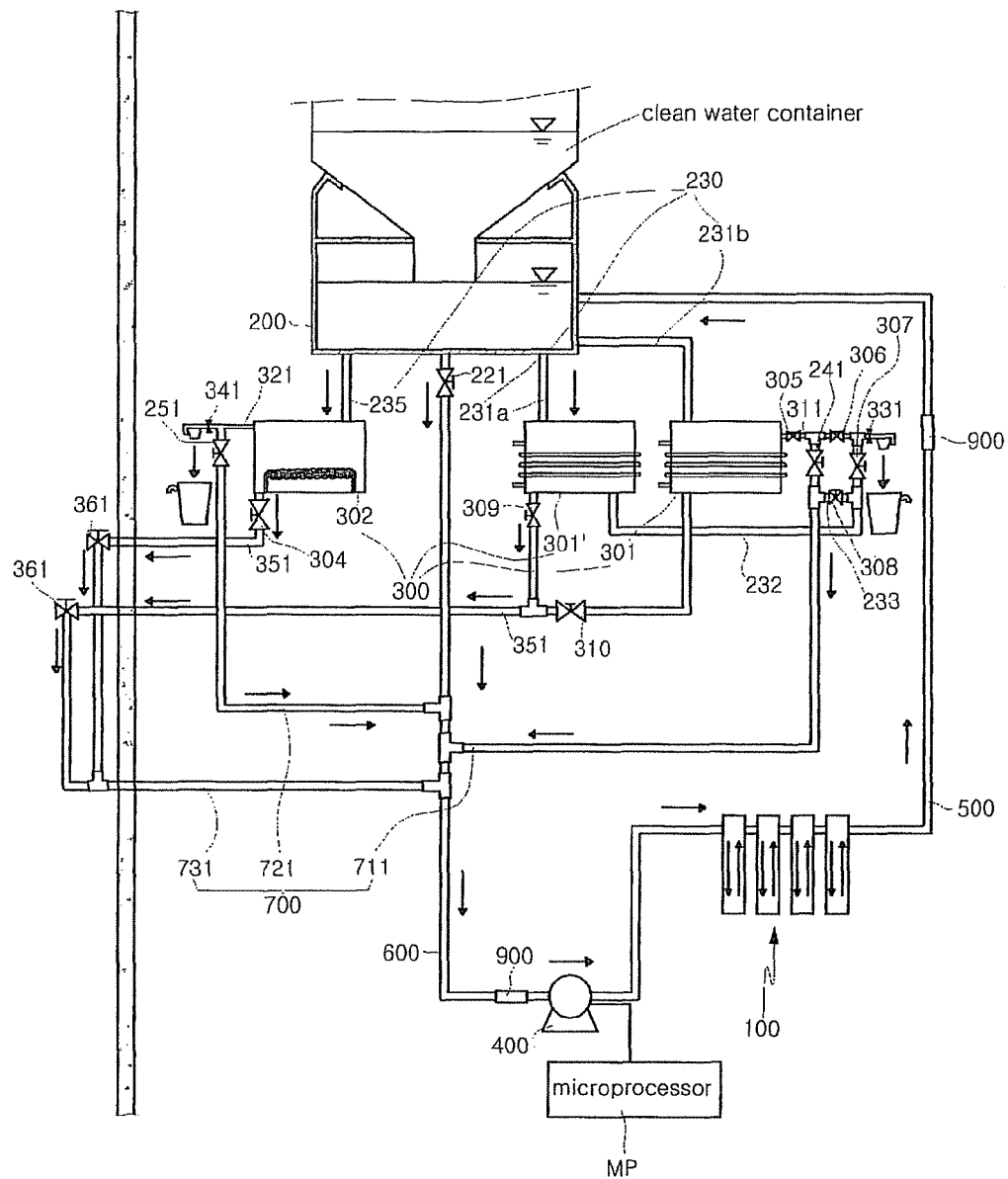
FIG. 4 is a view of the circulation type water purifier applied to a spring water supply type according to the embodiment of the present invention.
Figure 5:
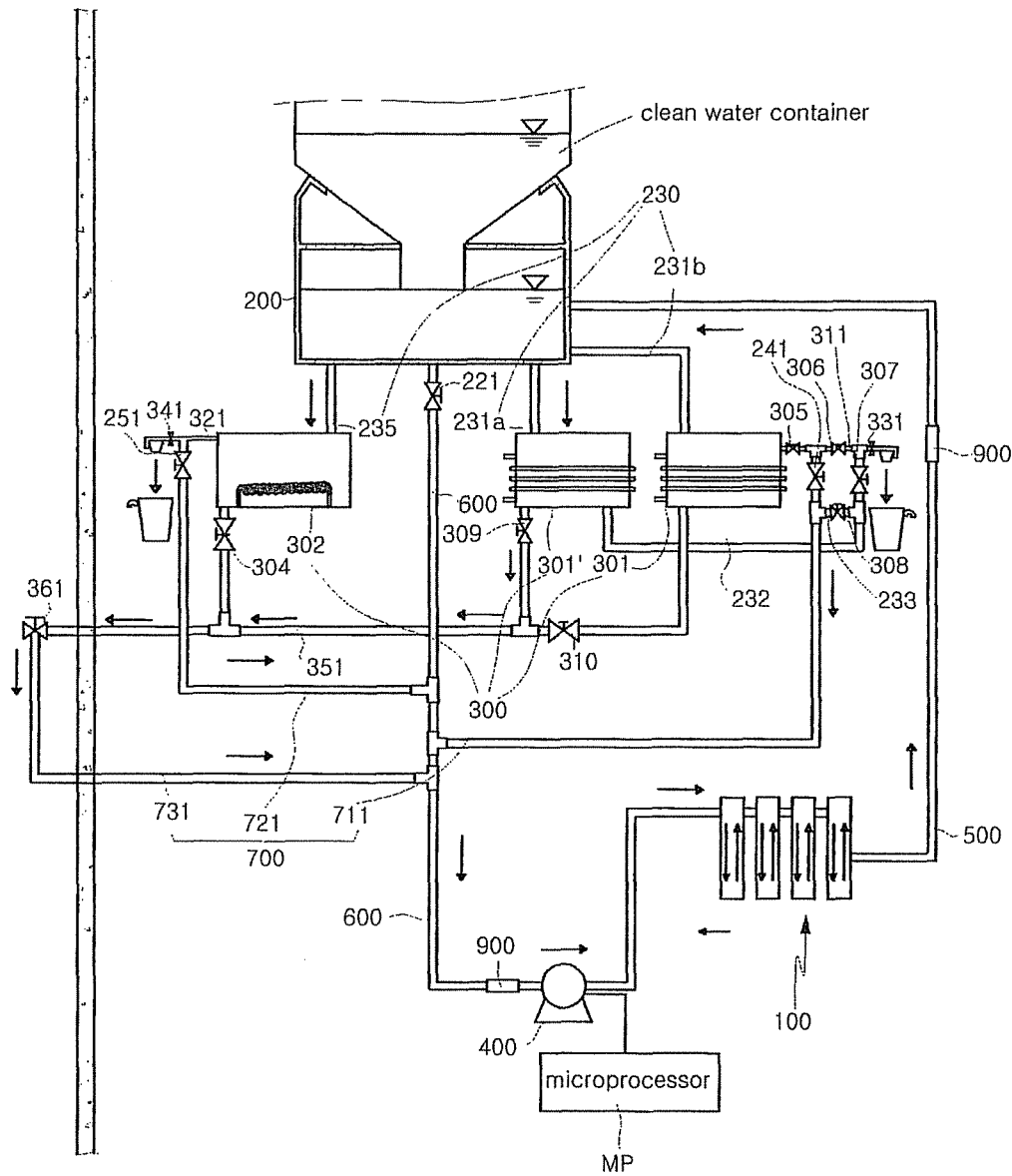
FIG. 5 is a view of the circulation type water purifier applied to another spring water supply type according to the embodiment of the present invention.
Figure 6:
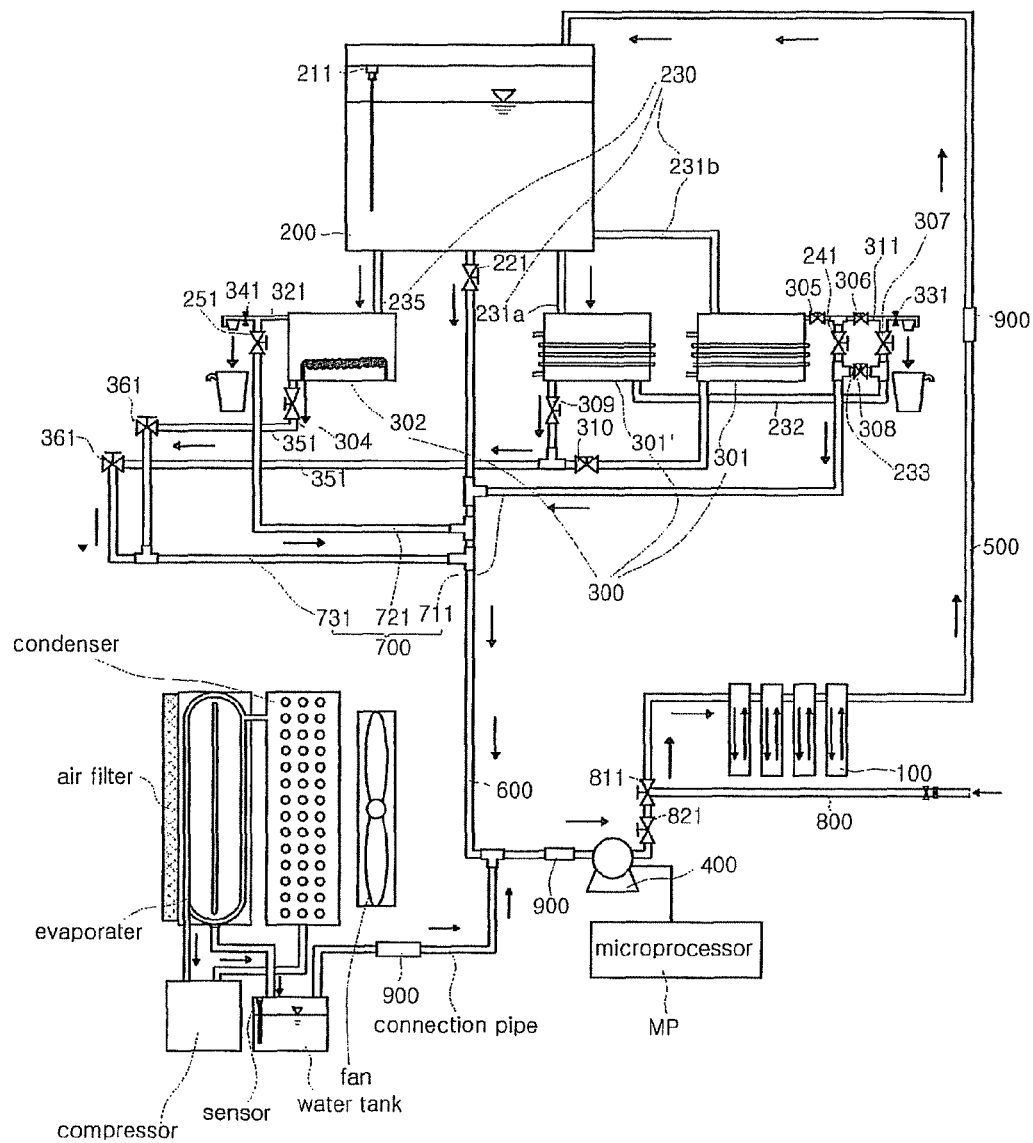
FIG. 6 is a view of the circulation type water purifier applied to an air collection type and the faucet direct-connection type according to the embodiment of the present invention.
Figure 7:
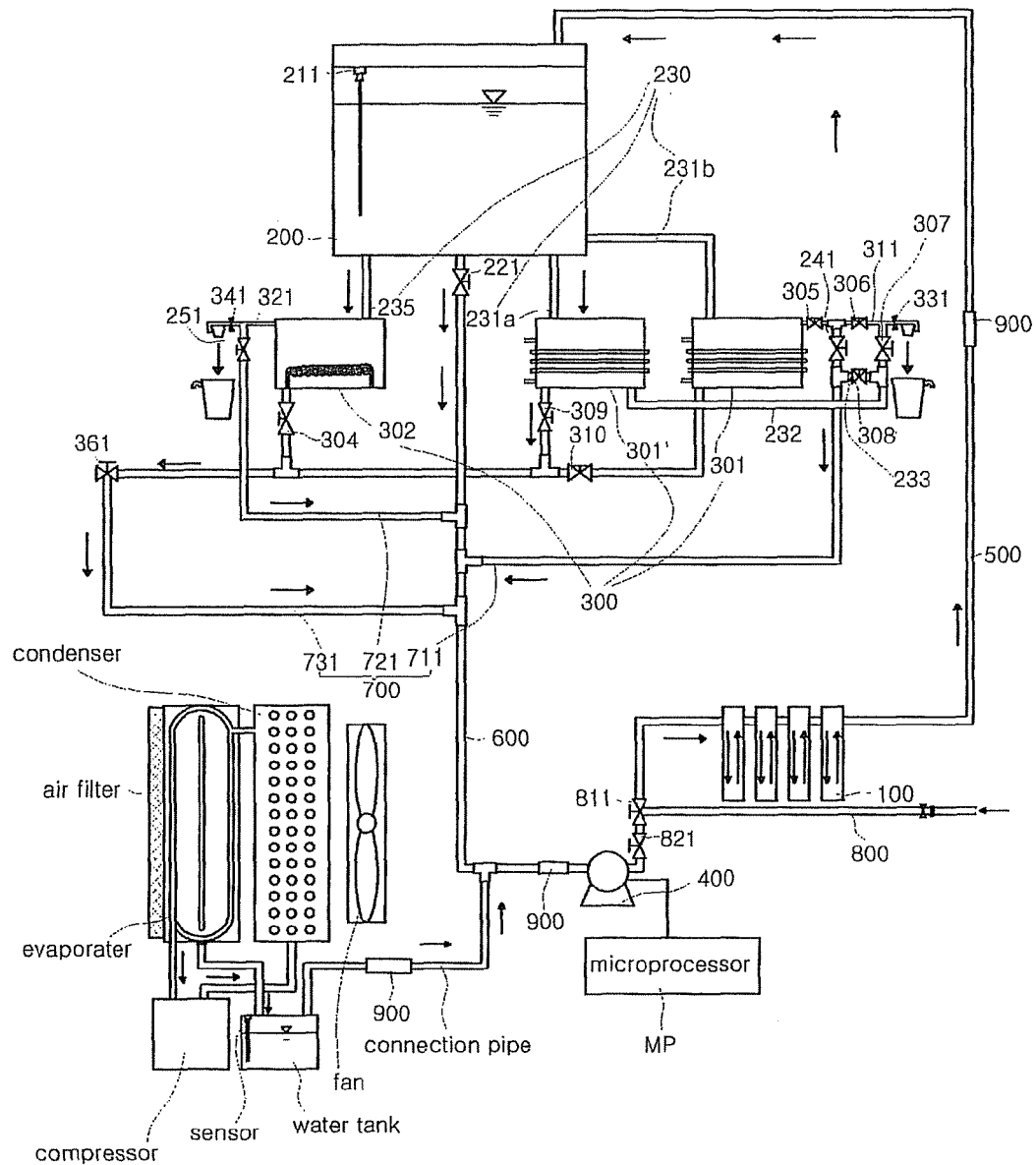
FIG. 7 is a view of the circulation type water purifier applied to the air collection type and the another faucet direct-connection type according to the embodiment of the present invention.
Figure 8:
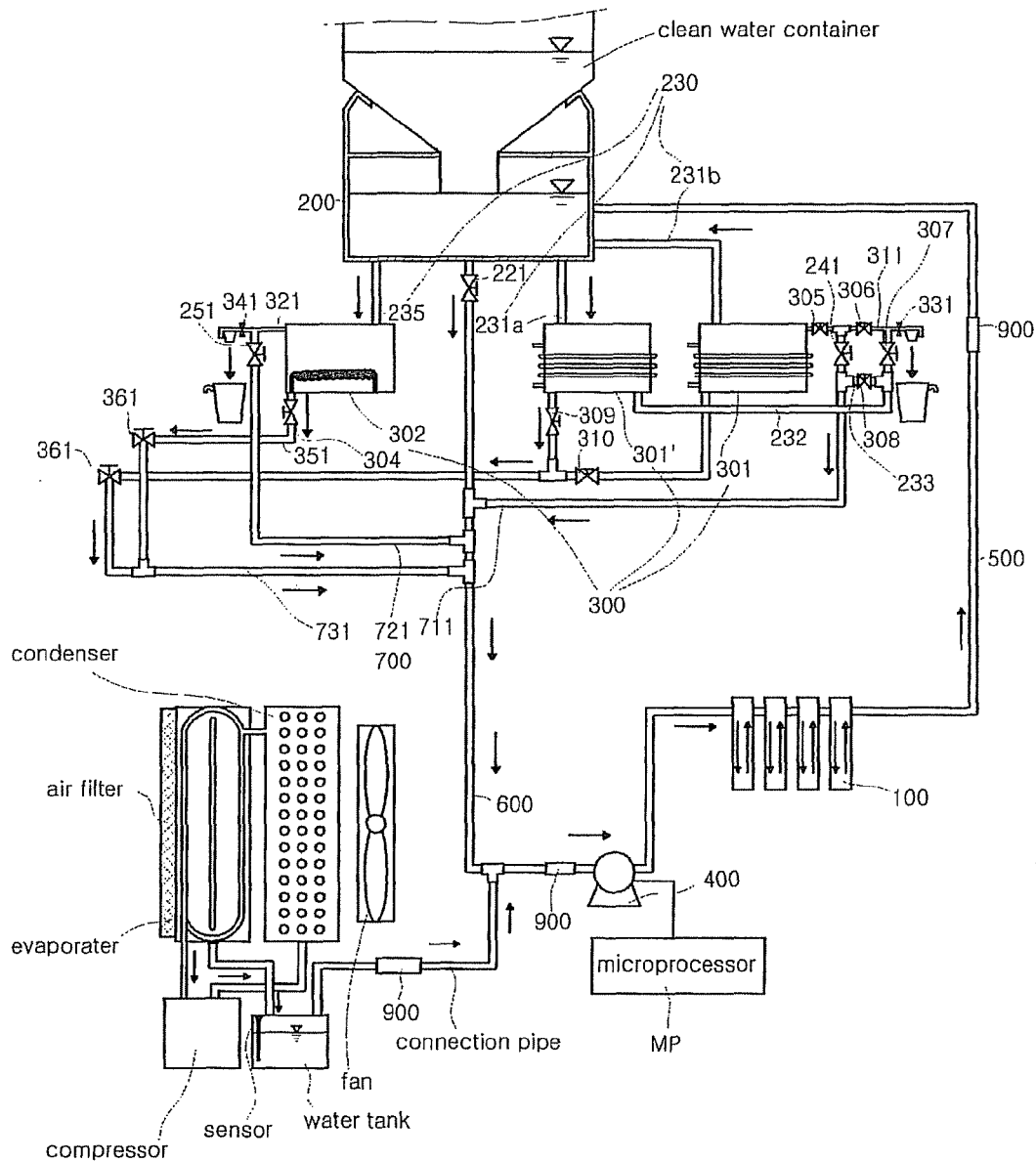
FIG. 8 is a view of the circulation type water purifier applied to the air collection type and the spring water supply type according to the embodiment of the present invention.
Figure 9:
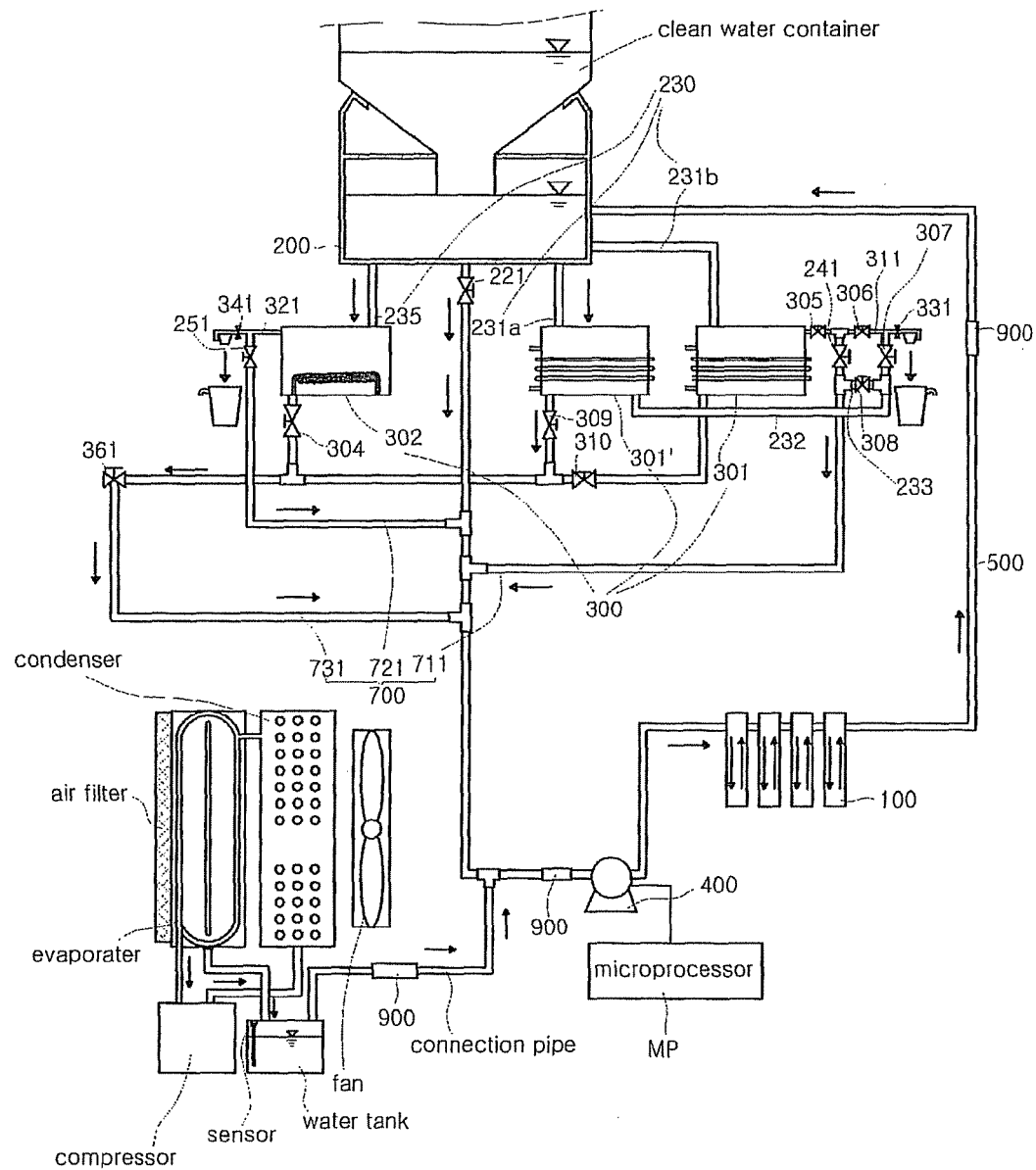
FIG. 9 is a view of the circulation type water purifier applied to the air collection type and the another spring water supply type according to the embodiment of the present invention.
Figure 10:
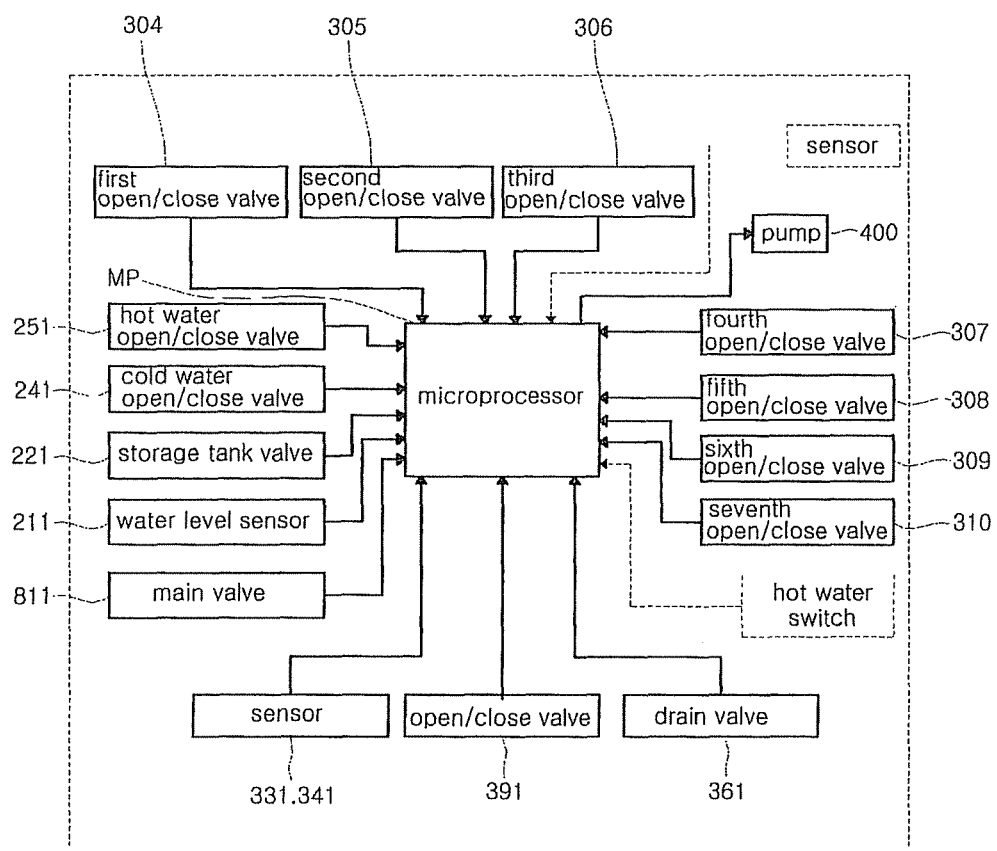
FIG. 10 is a block diagram showing the connection structure of a microcomputer in the circulation type water purifier.
Figure 11:
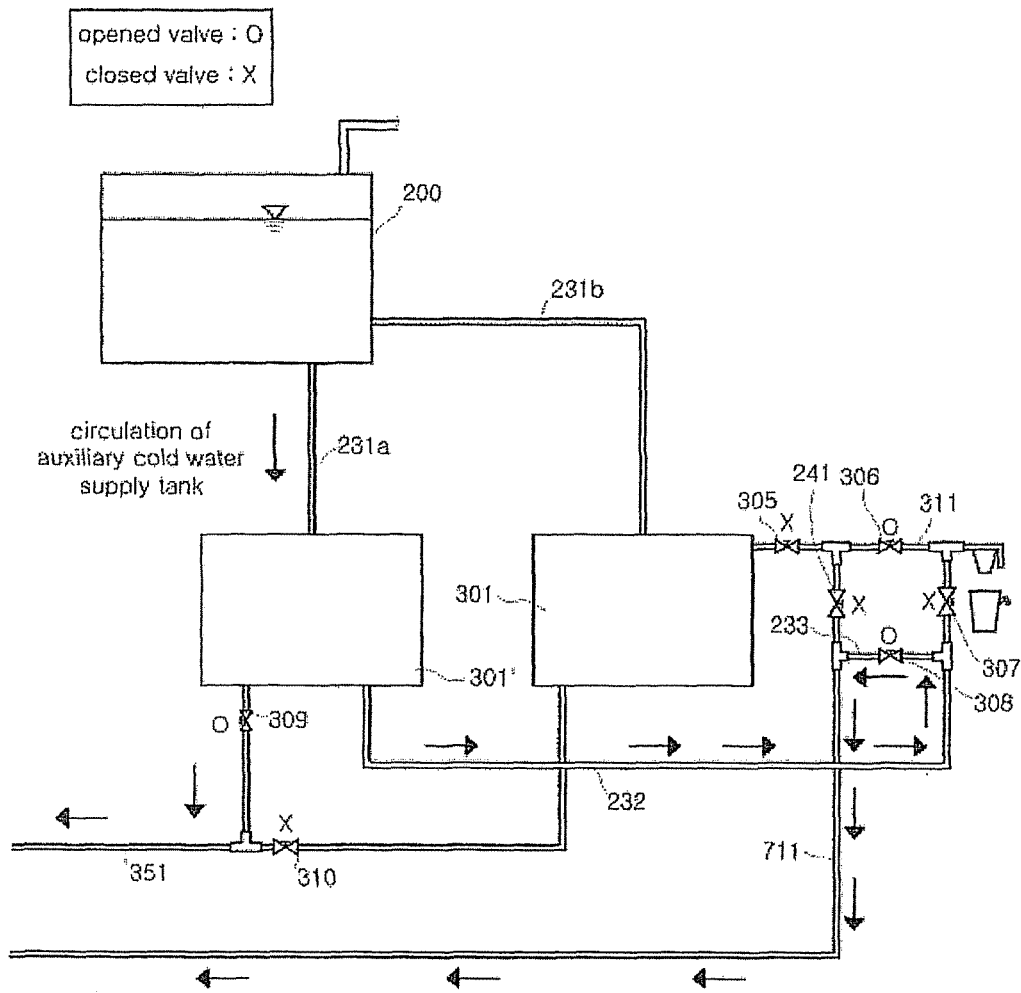
FIG. 11 is a view showing a process of circulating water flowed into an auxiliary cold water supply tank in the circulation type water purifier according to the embodiment of the present invention.
Figure 12:
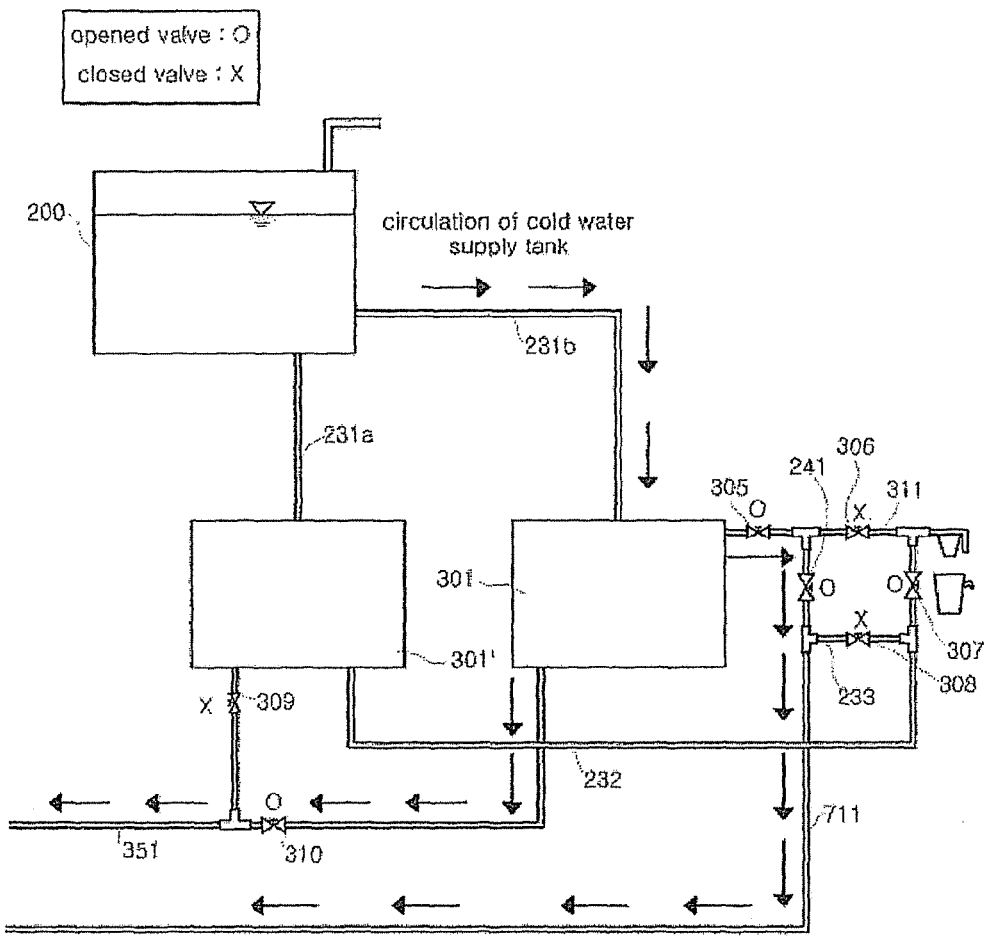
FIG. 12 is a view showing a process of circulating water flowed into a cold water supply tank in the circulation type water purifier according to the embodiment of the present invention.
Figure 13:
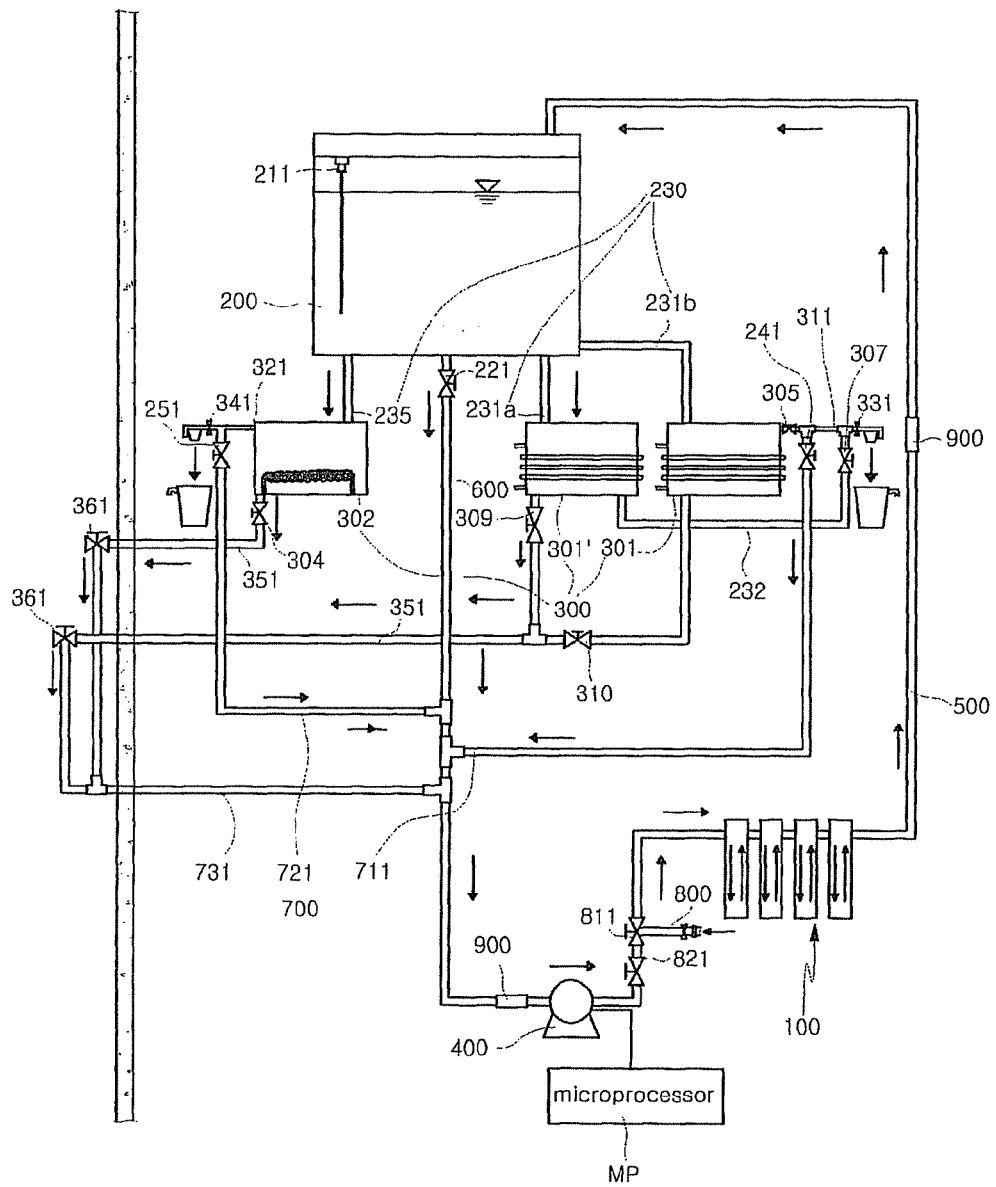
FIG. 13 is a view of a circulation type water purifier according to another embodiment of the present invention.
Figure 14:
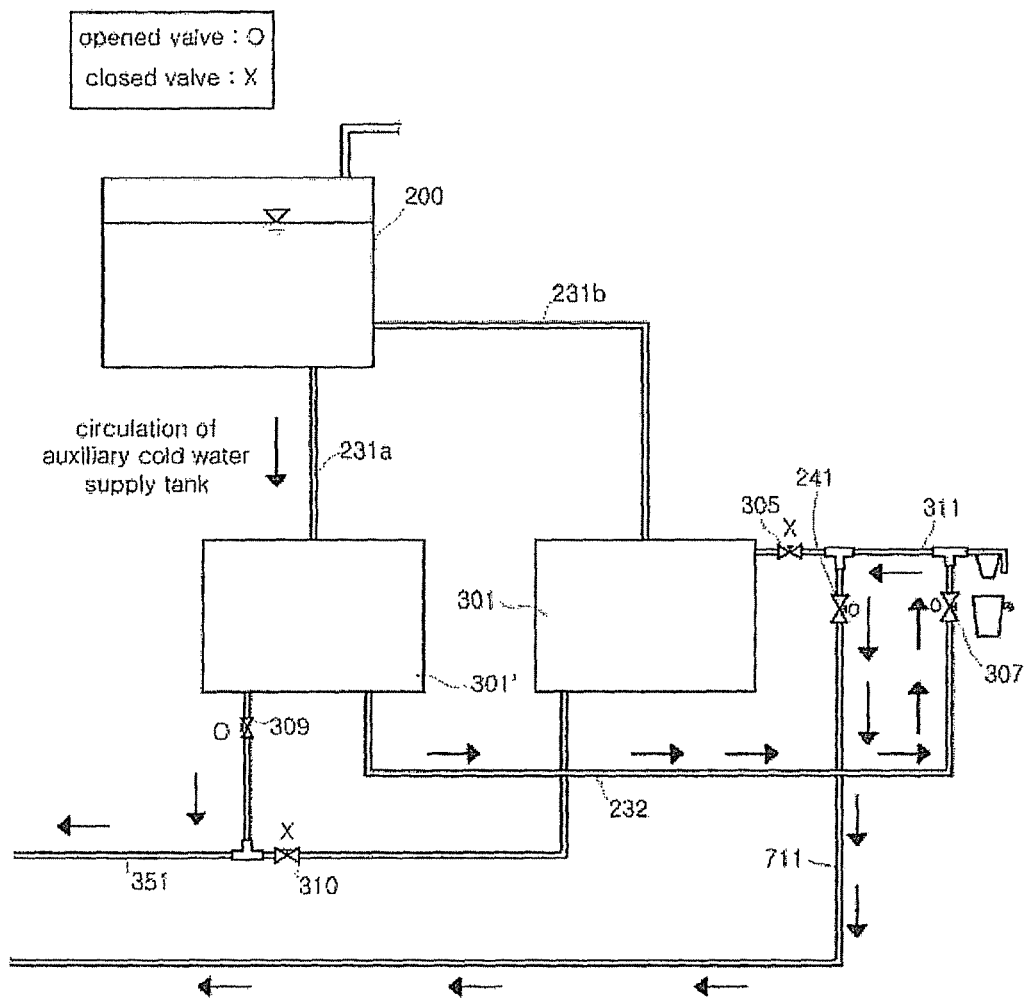
FIG. 14 is a view showing a process of circulating water flowed into an auxiliary cold water supply tank in the circulation type water purifier of FIG. 13.
Figure 15:
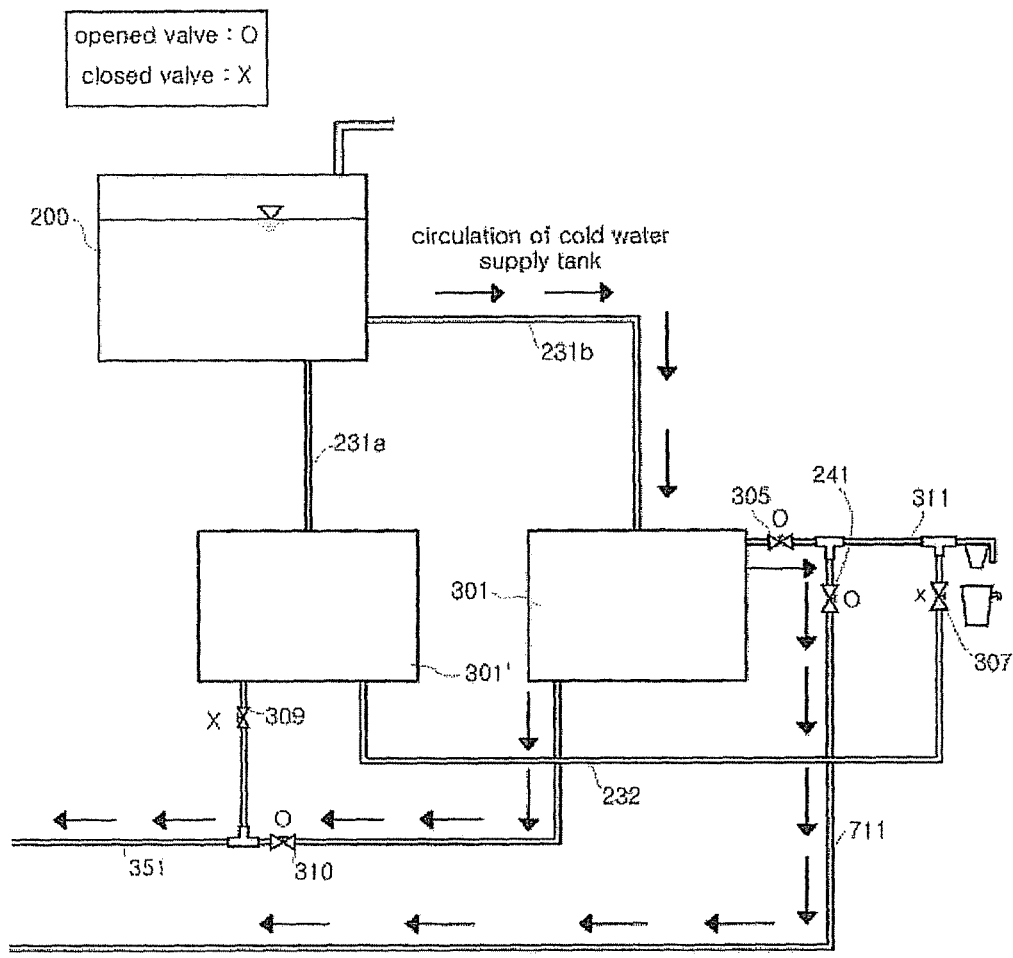
FIG. 15 is a view showing a process of circulating water flowed into a cold water supply tank in the circulation type water purifier of FIG. 13.

FIG. 2 is a view of a circulation type water purifier applied to a faucet direct-connection type according to an embodiment of the present invention. FIG. 3 is a view of the circulation type water purifier applied to another faucet direct-connection type according to the embodiment of the present invention. FIG. 4 is a view of the circulation type water purifier applied to a spring water supply type according to the embodiment of the present invention. FIG. 5 is a view of the circulation type water purifier applied to another spring water supply type according to the embodiment of the present invention. FIG. 6 is a view of the circulation type water purifier applied to an air collection type and the faucet direct-connection type according to the embodiment of the present invention. FIG. 7 is a view of the circulation type water purifier applied to the air collection type and the another faucet direct-connection type according to the embodiment of the present invention. FIG. 8 is a view of the circulation type water purifier applied to the air collection type and the spring water supply type according to the embodiment of the present invention. FIG. 9 is a view of the circulation type water purifier applied to the air collection type and the another spring water supply type according to the embodiment of the present invention. FIG. 10 is a block diagram showing the connection structure of a microcomputer in the circulation type water purifier. FIG. 11 is a view showing a process of circulating water flowed into an auxiliary cold water supply tank in the circulation type water purifier according to the embodiment of the present invention. FIG. 12 is a view showing a process of circulating water flowed into a cold water supply tank in the circulation type water purifier according to the embodiment of the present invention. FIG. 13 is a view of a circulation type water purifier according to another embodiment of the present invention. FIG. 14 is a view showing a process of circulating water flowed into an auxiliary cold water supply tank in the circulation type water purifier of FIG. 13. FIG. 15 is a view showing a process of circulating water flowed into a cold water supply tank in the circulation type water purifier of FIG. 13.

As shown in FIGS. 2 to 9, the circulation type water purifier according to the embodiment of the present invention includes a clean water filter 100; a storage tank 200 in which water purified through the clean water filter 100; a hot water supply tank 300 cooling and heating water supplied from the storage tank to drain the cooled water and the heated water to respective outlets; a drain pipe 351 connected to the cold/hot water supply tank 300 to drain water in the cold/hot supply water tank 300 when cleansing the interior of the cold/hot supply water tank 300; a pump 400 periodically circulating water at every circulation time under a control of a microcomputer MP; a circulation pipe (described in the explanation of reference numerals in the drawings) connecting the clean water filter 100, the storage tank 200, the cold/hot water tank 300, the drain pipe 351 and the pump 400; and a sterilizer 900 installed in the circulation pipe to sterilize water flowing into the circulation pipe.

At this time, the circulation pipe includes a first circulation pipe 500 connecting the clean water filter 100 and the storage tank 300; a first auxiliary circulation pipe 230 connecting the storage tank 200 and the cold/hot water supply tank 300; a second circulation pipe 600 connecting the storage tank 200 and the clean water filter 100; and a second auxiliary circulation pipe 700 connecting the cold/hot water supply tank 300 and the second circulation pipe 600.

Here, the first auxiliary circulation pipe 230 includes first auxiliary connection pipes 231a and 231b connecting the storage tank 200 and a cold water supply tank 301; and a second auxiliary connection pipe 235 connecting the storage tank 200 and a hot water supply tank 302. The cold water supply tank 301 further includes an auxiliary cold water supply tank 301'. The first auxiliary connection pipes 231a and 231b include a first auxiliary connection pipe 231a connecting the storage tank 200 and the auxiliary cold water supply tank 301' and a first auxiliary connection pipe 231b connecting the storage tank 200 and the cold water supply tank 301. The second auxiliary circulation pipe 700 includes a third auxiliary connection pipe 711 connecting a cold water outlet 311 and the second circulation pipe 600; a fourth auxiliary connection pipe 721 connecting a hot water outlet 321 and the second circulation pipe 600; and a fifth auxiliary connection pipe 731 connecting the drain pipe 351 and the second circulation pipe 600. The circulation type water purifier according to the embodiment of the present invention may be applied to an air collection type, a faucet direct-connection type and a spring water supply type. However, in the specification, the faucet direct-connection type will be described in detail as an example.

As shown in FIG. 2, tap water flowed into the interior of the water purifier along a faucet direct-connection pipe 800 is flowed into the second circulation pipe 600 through a main valve 811 and moves to the clean water filter 100. At this time, the main valve 811 is usually opened to allow the tap water to be flowed into the second circulation pipe 600 and closed when water inside the water purifier is filled with water.

The main valve 811 is opened so that when the tap water is flowed into the water purifier, the tap water moves along the faucet direct-connection pipe 800 into which the tap water is flowed and the first circulation pipe 500 connected to the clean water filter 100. At this time, a backwater valve is further provided to allow the flowed water to flow only in a direction of the clean water filter 100 and to prevent the flowed water from flowing backward.

When the pump 400 is operated and water is circulated, the main valve 811 is closed so that the water is not flowed into the second circulation pipe 600 from the faucet direct-connection pipe 800, and the backwater valve 821 is opened so that the water is circulated.

At this time, the main valve 811 is electrically connected to the microcomputer MP, and various types of valves may be applied to the main valve 811 but may include a solenoid valve operated in response to an electric signal, and the like. The backwater valve that allows water flowing through the second circulation pipe 600 to flow into the first circulation pipe 500 through the clean water filter 100 may be configured as a one-direction valve that allows water to flow only in a direction.

Meanwhile, the tap water flowed into the clean water filter 100 is purified through at least one or more filters constituting the clean water filter 100. Here, the clean water filter 100 may include a sediment filter, a pre-carbon filter, a membrane filter, a post-carbon filter, a TCR filter, a UV sterilizer filter and the like.

The water purified by the clean water filter 100 moves to the storage bank 200 along the first circulation pipe 500. The storage tank 200 further includes a water level sensor 211. If water inside the storage tank 200 reaches a predetermined water level, the water level sensor 211 electrically connected to the microcomputer MP prevents the water from being flowed into the interior of the storage tank 200. At this time, if information is transferred from the water level sensor 211 to the microcomputer MP so as to prevent water from being flowed into the interior of the storage tank 200, the main valve 811 is closed under a control of the microcomputer MP, and the inflow of the tap water to the interior of the storage tank 200 is stopped, thereby preventing the water from being overflowed.

The water stored in the storage bank 200 is flowed into the cold/hot water supply tank 300. The cold/hot water supply tank 300 includes a cold water supply tank 301 cooling water supplied from the storage bank 200 and then draining the supplied water to the cold water outlet 311; and a hot water supply bank 302 heating water supplied from the storage bank 200 and then draining the supplied water to the hot water outlet 321. The cold water outlet 311 and the hot water outlets 321 are formed in the cold water supply tank 301 and the hot water supply tank 302, respectively. The cold water supply tank 301 further includes an auxiliary cold water supply tank 301' so that when water is circulated, the water in the cold water supply tank 301 and the auxiliary cold water supply tank 301' is alternately circulated. Here, the water in the storage bank 200 is flowed into the cold water supply tank 301, the auxiliary cold water supply tank 301' and the hot water supply bank 302 along the first auxiliary connection pipes 231a and 231b and the second auxiliary connection pipe 235.

The cold water supply tank 301 and the auxiliary cold water supply tank 301' are provided together so that water in the cold water supply tank 301 and the auxiliary cold water supply tank 301' are alternately circulated. Accordingly, a user can always drink cool water through the cold water outlet 311. That is, if only the cold water supply tank 301 is provided, the water in the cold water supply tank 301 is mixed with water at a normal temperature flowed into the interior of the cold water supply tank 301 in circulation of water, and therefore, the mixed water becomes tepid. Since it takes about 10 to 20 minutes for the tepid water to be again cooled, the user cannot drink cool water for this time.

Therefore, when water is circulated to the cold water supply tank 301, the water in the auxiliary cold water supply tank 301' is not circulated. When water is circulated next time, the water in the auxiliary cold water supply tank 301' is circulated, and the water in the cold water supply tank 301 is not circulated. Such circulation processes are alternately repeated.

When water is drained through the cold water outlet 311, the circulation of water is temporarily stopped under the control of the microcomputer MP. The water in the cold water supply tank 301 is drained to the cold water outlet 311, and the water in the auxiliary cold water supply tank 301' is drained to the cold water outlet 311 through a first auxiliary water supply connection pipe 232 connecting a lower portion of the auxiliary cold water supply tank 301' and the cold water outlet 311, which will be described below.

The circulation pipes connected to the storage tank 200, the cold water supply tank 301 and the auxiliary cold water supply tank 301' and the circulation structure of water through the circulation pipes will be described below with reference to FIG. 2.

First, the respective circulation pipes and valves connected to them will be described. The respective valves (first to seventh open/close values 304 to 310) are electrically connected to the microcomputer MP. Solenoid valves may be used as the valves.

The first auxiliary connection pipe 231a is connected to the storage tank 200 and the auxiliary cold water supply tank 301' and the drain pipe 351 having the sixth open/close valve 309 is connected to the auxiliary cold water supply tank 301'. The first auxiliary water supply connection pipe 232 having the fourth open/close valve 307 connected to the cold water outlet 311 is further installed to the auxiliary cold water supply tank 301'. The first auxiliary connection pipe 231b is connected between the storage tank 200 and the cold water supply tank 301, and the drain pipe 351 having the seventh open/close valve 310 extended from the cold water supply tank 301 is connected to the drain pipe 351 extended from the auxiliary cold water supply tank 301'. The second and third open/close valves 305 and 306 are coupled to the cold water outlet 311 connected to the cold water supply tank 301, and a second auxiliary water supply connection pipe 233 having the fifth open/close valve 308 is connected to the first auxiliary water supply connection pipe 232 and the third auxiliary connection pipe 711. At this time, each of the first auxiliary connection pipes 231a and 231b, the drain pipe 351 and the first and second auxiliary water supply connection pipes 232 and 233 may be installed to have the shortest distance.

Hereinafter, paths along which water is circulated to the cold water supply tank 301 and the auxiliary cold water supply tank 301' will be described.

a) Path along which water is circulated to the cold water supply tank 301 (See FIG. 12).

First, the third, fifth and sixth open/close valves 306, 308 and 309 are closed, and the second, fourth and seventh open/close valves 305, 307 and 310 and a cold water open/close valve 241 (in this figure, a closed valve is designated by "X" and an opened valve is designated by "O".

Water in the storage tank 200 is flowed into the cold water supply tank 301 through the first auxiliary connection pipe 231b.→The water is flowed through the drain pipe 351 connected to the cold water supply tank 301 and the cold water outlet 311.→The water is flowed through the third auxiliary connection pipe 711.

b) Path Along which Water is Circulated to the Auxiliary Cold Water Supply Tank 301' (See FIG. 11).

First, the second, fourth and seventh valves 307, 307 and 310 and the cold water open/close valve 241 are closed, and the third, fifth and sixth open/close valves 306, 308 and 309 are opened (in this figure, a closed valve is designated by "X" and an opened valve is designated by "O".

Water in the storage tank 200 is flowed into the auxiliary cold water supply tank 301' through the first auxiliary connection pipe 231a.→The water is flowed through the drain pipe 351 and the first auxiliary water supply connection pipe 232, connected to the auxiliary cold water supply tank 301', →The water is flowed through the second auxiliary water supply connection pipe 233.→The water is flowed through the third auxiliary connection pipe 711.

Each of the cold water supply tank 301, the auxiliary cold water supply tank 301' and the hot water supply tank 302 further includes the drain pipe 351. The drain pipe 351 is controlled to drain water in each of the storage tank 200, the cold water supply tank 301, the auxiliary cold water supply tank 301' and the hot water supply tank 302 to the outside when cleansing the circulation type water purifier, and to supply water in each of the cold water supply tank 301, the auxiliary cold water supply tank 301' and the hot water supply tank 302 when circulating water in the circulation type water purifier. The drain pipe 351 may be installed to have the shortest distance from each of the cold water supply tank 301; the auxiliary cold water supply tank 301' and the hot water supply tank 302: A drain valve 361 electrically connected to the microcomputer MP is coupled to one end of the drain pipe 351 through which water in each of the storage tank 200, the auxiliary cold water supply tank 301', the cold water supply tank 301 and the hot water supply tank 302 is drained. The drain valve 361 is closed when circulating water in the circulation type water purifier and opened when water in the each of the storage 200, the cold water supply tank 301, the auxiliary water supply tank 301? and the hot water supply tank 302 is drained to the outside.

The drain valve 361 may be manually installed or installed to be automatically operated by the microcomputer MP. Preferably, the drain valve 361 is automatically controlled by the microcomputer MP. When water is circulated, the drain valve 361 allows the water flowed through the drain pipe 351 to be flowed into the second circulation pipe 600 along the fifth auxiliary connection pipe 731. When water in the storage tank 200 and the cold/hot water supply tank 300 is drained to the outside through the drain pipe 351, the drain valve 361 allows the water not to be flowed into the fifth auxiliary connection pipe 731 but to be drained to the outside. Therefore, the drain valve 361 may include a three-way valve, a solenoid valve operated in response to electric signals, and the like. The drain valve 351 is coupled to an end of an outlet through which the water in the drain pipe 351 is drained to the outside as close as possible. Accordingly, the circulation path of water has the maximum length when water is circulated into the interior of the water purifier, and a path along which water is not circulated has the minimum length, so that production of bacteria and microbes can be minimized.

That is, since water is circulated through a pipe connected to the inner portion of the drain valve 361, it is likely that the microbes are highly produced when the length of the drain pipe 351 connected to the outer portion of the drain valve 361 is installed long.

The first open/close valve 304 is installed at an entrance portion through which water is flowed from the hot water supply tank 302 to the drain pipe 351. When a hot water switch (not shown) of the hot water supply tank 302 is turned on, the first open/close valve 304 is closed so that the water in the hot water supply tank 302 is not circulated. When the hot water switch (not shown) of the hot water supply tank 302 is turned off, the first open/close valve 304 is opened so that the water in the hot water supply tank 302 is circulated.

The hot water switch (not shown) is electrically connected to the microcomputer MP. The hot water switch (not shown) is turned on when the water in the hot water supply tank 302 is filled and heated at over a predetermined temperature, and turned off when the water in the hot water supply tank 302 does not reach the predetermined temperature or is not filled. Although the water in the hot water supply tank 302 is not circulated, the interior of the hot water supply tank 302 is in a sterilization state due to the temperature of water heated hot. The first open/close valve 304 is opened when the water in the hot water supply tank 302 is drained to the outside.

Meanwhile, the cold water outlet 311 and the hot water outlet 321 further include sensors 331 and 341 sensing an amount of water used, respectively. The sensors 331 and 341 are electrically connected to the microcomputer MP. That is, the sensors 331 and 341 transfers information on an amount of water used to the microcomputer MP, and the microcomputer MP controls the pump 400 to be operated based on the information so that water in the water purifier is circulated. Preferably, the pump 400 is operated at least 1 to 36 times for three hours.

More specifically, since the amount of water used in the cold/hot water supply tank 300 is great at daytime when the amount of water used is great, water is flowed through the faucet direct-connection pipe 800 and circulated. Therefore, the pump 400 is preferably operated once or more per hour so that the water is circulated. Preferably, the pump 400 is operated twice or more per hour at nighttime when the amount of water used is small. Through such a structure, unnecessary operations of the pump 400 are prevented so that power consumption can be saved, and an overload applied to the pump 400 can be prevented.

When installing the third and fourth auxiliary connection pipes 711 and 721, the third and fourth auxiliary connection pipes 711 and 721 are respectively connected to ends of the cold and hot water outlets 311 and 321 and then connected to the second circulation pipe 600. At this time, the cold and hot water open/close valves 241 and 251 are respectively coupled to the third and fourth auxiliary connection pipes 711 and 721 so as to be electrically connected to the microcomputer MP. The cold and hot water open/close valves 241 and 251 interrupts or allows the water in the cold water supply tank 301, the auxiliary cold water supply tank 301' and the hot water supply tank 302 to be flowed into the second circulation pipe 600 under the control of the microcomputer MP. That is, when the water in the storage tank 200 and the cold/hot water supply tank 300 is drained to the outside through the drain pipe 351, the cold and hot open/close valves 241 and 251 prevent the water in the cold water supply tank 301, the auxiliary cold water supply tank 301' and the hot water supply tank 302 from being flowed into the second circulation pipe 600 and allow the water to be drained to the outside through the drain pipe 351. At this time, the main valve 811 is closed, and the drain valve 361 is closed so that water is not flowed into the second circulation pipe 600 along the fifth auxiliary connection pipe 731. The third, fourth and fifth open/close valves 306, 307 and 308, the cold water open/close valve 241 and the hot water open/close valve 251 are closed.

The water stored in the storage tank 200 is flowed into the clean water filter 100 along the second circulation pipe 600. Preferably, a storage tank valve 221 controlled by the microcomputer MP is installed to the second circulation pipe 600. The storage tank valve 221 is closed at ordinary times and opened only when the pump 400 is operated so that water is circulated. At this time, the storage tank valve 221 is installed higher than the connection portions of the third, fourth and fifth auxiliary connection pipes 711, 721 and 731. Preferably, the storage tank valve 221 is installed between the storage tank 200 and the third, fourth and fifth auxiliary connection pipes 711, 721 and 731.

The pump 400 electrically connected to the microcomputer MP is installed to the second circulation pipe 600. The pump 400 is operated to allow water flowed into the second circulation pipe 600 to be continuously supplied to the clean water filter 100.

As described above, the path along which water is circulated in operation of the pump 400 will be described as follow.

First, when water in the cold water supply tank 301 is circulated, the pump 400 is operated, and the water is circulated sequentially through the second circulation pipe 600, the clean water filter 100, the first circulation pipe 600, the storage tank 200, the first and second auxiliary connection pipes 231b and 235 and the second circulation pipe 600. The water flowed from the storage tank 200 to the first and second auxiliary connection pipes 231b and 235 is periodically circulated per predetermined time as follows:

① the first auxiliary connection pipe 231b→the cold water supply tank 301→the drain pipe 351 and the cold water outlet 311, connected to the cold water supply tank 301→the third auxiliary connection pipe 711→the second circulation pipe 600.

② the second auxiliary connection pipe 235→the drain pipe 351 and the fourth and fifth auxiliary connection pipes 721 and 731, connected to the hot water supply tank 302→the second circulation pipe 600.

Next, when water in the auxiliary cold water supply tank 301' is circulated, the pump 400 is operated, and the water is circulated sequentially through the second circulation pipe 600, the clean water filter 100, the first circulation pipe 500, the storage tank 200, the first and second auxiliary connection pipes 231a and 235 and the second circulation pipe 600. The water flowed from the storage tank 200 to the first and second auxiliary connection pipes 231a and 235 is periodically circulated per predetermined time as follows:

① the first auxiliary connection pipe 231→the auxiliary cold water supply tank 301'→the drain pipe 351 and the first auxiliary water supply connection pipe 232, connected to the auxiliary cold water supply tank 301'→the second auxiliary water supply connection pipe 233→the third auxiliary connection pipe 711→the second circulation pipe 600.

② the second auxiliary connection pipe 235→the drain pipe 351 and the fourth and fifth auxiliary connection pipes 721 and 731, connected to the hot water supply tank 302→the second circulation pipe 600.

When water is circulated, the water in the water purifier is alternately circulated to the cold water supply tank 301 and the auxiliary cold water supply tank 301'. When the water is drained through the cold water outlet 311 during the circulation of water, the circulation of water is temporarily stopped under the control of the microcomputer MP. When the water in the cold water supply tank 301 is drained to supply cool water, the second and third open/close valves 305 and 306 are opened, the fourth and seventh open/close valves 307 and 310 and the cold water open/close valve 311 are closed. When the water in the auxiliary cold water supply tank 301' is drained, the fourth open/close valve 307 is opened, and the third, fifth and sixth open/close valves 306, 308 and 309 are closed.

Meanwhile, the sterilizer 900 electrically connected to the microcomputer MP is further provided to the drain pipe 351 and the circulation pipes. At least one or more sterilizers 900 are provided to the circulation pipes and the drain pipe 351 so that water passing through the circulation pipes ad the drain pipe 351 is sterilized. The sterilizer 900 includes a UV sterilizer, a far-infrared sterilizer, a silver nano sterilizer, an ozone sterilizer, a photocatalytic sterilizer and the like. The sterilizer 900 is installed around an outer circumferential surface of each of the circulation pipes and the drain pipe 351. The sterilizer 900 is an additional device for sterilizing microbes and minimizes production of the microbes to provide optimum drinking water.

The interiors of the storage tank 200, the cold/hot water supply tank 300, the circulation pipes and the drain pipe 351 are coated with an antibiotic material so that production of microbes is maximally prevented. At this time, the antibiotic material may include any one of silver, carbon, copper, stainless steel and titanium dioxide or a mixture comprising two or more of them.

Embodiments

Hereinafter, operation states and embodiments of the present invention applied to a faucet direct-connection type, an air collection type and a spring water supply type will be described in conjunction with the drawings.

First Embodiment

First Faucet Direct-Connection Type (See FIG. 2)

1) Water is flowed into the second circulation pipe 600 through the faucet direct-connection pipe 800.

2) The flowed water is flowed into the clean water filter 100.

3) The water filtered by the clean water filter 100 is flowed into the storage tank 200 along the first circulation pipe 500.

4) The water in the storage tank 200 is flowed into the cold water supply tank 301, the auxiliary cold water supply tank 301' and the hot water supply tank 302 along the first auxiliary connection pipes 231a and 231b and the second auxiliary connection pipe 235.

5) The water in the cold water supply tank 301, the auxiliary cold water supply tank 301' and the hot water supply tank 302 is drained through the cold and hot water outlets 311 and 321 so as to supply drinking water.

6) The sensors 331 and 341 sense information on the drinking water and transfer the sensed information to the microcomputer MP.

7) The water in the cold water supply tank 301, the auxiliary cold water supply tank 301' and the hot water supply tank 302 is flowed into the second circulation pipe 600 along the drain pipe 351, the fifth auxiliary connection pipe 731, the third auxiliary connection pipe 711 and the fourth auxiliary connection pipe 721.

8) The water flowed into the second circulation pipe 600 is again flowed into the clean water filter 100.

9) The processes 1) to 8) form a circulation path before the pump 400 is operated. When the pump 400 is operated, the storage tank valve 221 installed in the second circulation pipe 600 is opened in the process 7), and the water in the storage tank 200 is flowed into the first auxiliary connection pipes 231a and 231b, the second auxiliary connection pipe 235 and the second circulation pipe 600.

10) First, when water in the cold water supply tank 301 is circulated, the pump 400 is operated, and the water is circulated sequentially through the second circulation pipe 600, the clean water filter 100, the first circulation pipe 600, the storage tank 200, the first and second auxiliary connection pipes 231b and 235 and the second circulation pipe 600. The water flowed from the storage tank 200 to the first and second auxiliary connection pipes 231b and 235 is periodically circulated per predetermined time as follows:

① the first auxiliary connection pipe 231b→the cold water supply tank 301→the drain pipe 351 and the cold water outlet 311, connected to the cold water supply tank 301→the third auxiliary connection pipe 711→the second circulation pipe 600.

② the second auxiliary connection pipe 235→the drain pipe 351 and the fourth and fifth auxiliary connection pipes 721 and 731, connected to the hot water supply tank 302→the second circulation pipe 600.

In ① and ②, the water flowed into the second circulation pipe 600 is again flowed into the clean water filter and periodically circulated per predetermined time.

11) Next, when water in the auxiliary cold water supply tank 301' is circulated, the pump 400 is operated, and the water is circulated sequentially through the second circulation pipe 600, the clean water filter 100, the first circulation pipe 500, the storage tank 200, the first and second auxiliary connection pipes 231a and 235 and the second circulation pipe 600. The water flowed from the storage tank 200 to the first and second auxiliary connection pipes 231a and 235 is periodically circulated per predetermined time as follows:

① the first auxiliary connection pipe 231→the auxiliary cold water supply tank 301'→the drain pipe 351 and the first auxiliary water supply connection pipe 232, connected to the auxiliary cold water supply tank 301'→the second auxiliary water supply connection pipe 233→the third auxiliary connection pipe 711→the second circulation pipe 600.

② the second auxiliary connection pipe 235→the drain pipe 351 and the fourth and fifth auxiliary connection pipes 721 and 731, connected to the hot water supply tank 302→the second circulation pipe 600.

12) In ① and ② the water flowed into the second circulation pipe 600 is again flowed into the clean water filter 100 and periodically circulated per predetermined time. The water in the cold water supply tank 301, the auxiliary cold water supply tank 301' and the hot water supply tank 302 is drained through the cold and hot water outlets so as to supply drinking water.

13) The sensors 331 and 341 sense information on the drinking water and transfer the sensed information to the microcomputer MP. When the water in the cold water supply tank 301 and the auxiliary cold water supply tank 301' is drained in circulation of the water in the water purifier, the microcomputer MP senses the drainage and temporarily stops the circulation of water. When the water in the cold water supply tank 301 is drained (supplied) to supply cool drinking water, the second and third open/close valves 305 and 306 are opened, and the fourth and seventh open/close valves 307 and 310 and the cold water open/close valve 311 are closed. When the water in the auxiliary cold water supply tank 301' is drained (supplied), the fourth open/close valve 307 is opened, and the third, fifth and sixth open/close valves 306, 308 and 309 are closed (when water is circulated, a circulation state is again restored).

14) When the water in the cold water supply tank 301, the auxiliary cold water supply tank 301' and the hot water supply tank 302 is drained, the respective drain valves 361 are opened. At this time, the cold water open/close valve 241, the second, fourth and fifth open/close valves 305, 307 and 308 and the hot water open/close valve 251 are closed, and the first, sixth and seventh open/close valves 304, 309 and 310 are opened so that the water in the storage tank 200, the cold water supply tank 301, the auxiliary cold water supply tank 301' and the hot water supply tank 302 is drained through the drain pipe 351 (here, the path along which the water is flowed from the drain pipe 351 to the fifth auxiliary connection pipe 731 is interrupted).

15) When water is circulated by operation of the pump 400, the main valve 811 is closed so that tap water is not flowed. At this time, the water is circulated in one direction through the backwater valve 821.

16) The sterilizer 900 (a UV sterilizer, a far-infrared sterilizer, a silver nano sterilizer, an ozone sterilizer or a photocatalytic sterilizer) is installed to the first circulation pipe 500, the second circulation pipe 600 and the drain pipe 351 so that the water passing through the first circulation pipe 500, the second circulation pipe 600 and the drain pipe 351 is sterilized.

17) In the process 13), the pump 400 is operated three times per hour at daytime and six times per hour at nighttime depending on the amount of water drained through the cold and hot water outlets 311 and 321.

Second Faucet Direct-Connection Type (See FIG. 3)

The embodiment is similar to the first faucet direct-connection type but has a connection structure of the drain pipe 351 different from that of the drain pipe 351 in the first faucet direct-connection type. That is, the drain pipe 351 is connected to the cold water supply tank 301 and the auxiliary cold water supply tank 301' and directly connected to the drain pipe 351 connected to the hot water supply tank 302. Preferably, the drain pipe 351 is connected to have the shortest distance. The second faucet direct-connection type has only one drain valve 361.

1) Water is flowed into the second circulation pipe 600 through the faucet direct-connection pipe 800.

2) The flowed water is flowed into the clean water filter 100.

3) The water filtered by the clean water filter 100 is flowed into the storage tank 200 along the first circulation pipe 500.

4) The water in the storage tank 200 is flowed into the cold water supply tank 301, the auxiliary cold water supply tank 301' and the hdt water supply tank 302 along the first auxiliary connection pipes 231a and 231b and the second auxiliary connection pipe 235.

5) The water in the cold water supply tank 301, the auxiliary cold water supply tank 301' and the hot water supply tank 302 is drained through the cold and hot water outlets 311 and 321 so as to supply drinking water.

6) The sensors 331 and 341 sense information on the drinking water and transfer the sensed information to the microcomputer MP.

7) The water in the cold water supply tank 301, the auxiliary cold water supply tank 301' and the hot water supply tank 302 is flowed into the second circulation pipe 600 along the drain pipe 351, the fifth auxiliary connection pipe 731, the third auxiliary connection pipe 711 and the fourth auxiliary connection pipe 721.

8) The water flowed into the second circulation pipe 600 is again flowed into the clean water filter 100.

9) The processes 1) to 8) form a circulation path before the pump 400 is operated. When the pump 400 is operated, the storage tank valve 221 installed in the second circulation pipe 600 is opened in the process 7), and the water in the storage tank 200 is flowed into the first auxiliary connection pipes 231a and 231b, the second auxiliary connection pipe 235 and the second circulation pipe 600.

10) First, when water in the cold water supply tank 301 is circulated, the pump 400 is operated, and the water is circulated sequentially through the second circulation pipe 600, the clean water filter 100, the first circulation pipe 600, the storage tank 200, the first and second auxiliary connection pipes 231b and 235 and the second circulation pipe 600. The water flowed from the storage tank 200 to the first and second auxiliary connection pipes 231b and 235 is periodically circulated per predetermined time as follows:

① the first auxiliary connection pipe 231b→the cold water supply tank 301→the drain pipe 351 and the cold water outlet 311, connected to the cold water supply tank 301→the third auxiliary connection pipe 711→the second circulation pipe 600.

② the second auxiliary connection pipe 235→the drain pipe 351 and the fourth and fifth auxiliary connection pipes 721 and 731, connected to the hot water supply tank 302→the second circulation pipe 600.

In ① and ②, the water flowed into the second circulation pipe 600 is again flowed into the clean water filter and periodically circulated per predetermined time.

11) Next, when water in the auxiliary cold water supply tank 301' is circulated, the pump 400 is operated, and the water is circulated sequentially through the second circulation pipe 600, the clean water filter 100, the first circulation pipe 500, the storage tank 200, the first and second auxiliary connection pipes 231a and 235 and the second circulation pipe 600. The water flowed from the storage tank 200 to the first and second auxiliary connection pipes 231a and 235 is periodically circulated per predetermined time as follows:

① the first auxiliary connection pipe 231→the auxiliary cold water supply tank 301'→the drain pipe 351 and the first auxiliary water supply connection pipe 232, connected to the auxiliary cold water supply tank 301'→the second auxiliary water supply connection pipe 233→the third auxiliary connection pipe 711→the second circulation pipe 600.

② the second auxiliary connection pipe 235→the drain pipe 351 and the fourth and fifth auxiliary connection pipes 721 and 731, connected to the hot water supply tank 302→the second circulation pipe 600.

12) In ① and ②, the water flowed into the second circulation pipe 600 is again flowed into the clean water filter 100 and periodically circulated per predetermined time. The water in the cold water supply tank 301, the auxiliary cold water supply tank 301' and the hot water supply tank 302 is drained through the cold and hot water outlets so as to supply drinking water.

13) The sensors 331 and 341 sense information on the drinking water and transfer the sensed information to the microcomputer MP. When the water in the cold water supply tank 301 and the auxiliary cold water supply tank 301' is drained in circulation of the water in the water purifier, the microcomputer MP senses the drainage and temporarily stops the circulation of water. When the water in the cold water supply tank 301 is drained (supplied) to supply cool drinking water, the second and third open/close valves 305 and 306 are opened, and the fourth and seventh open/close valves 307 and 310 and the cold water open/close valve 311 are closed. When the water in the auxiliary cold water supply tank 301' is drained (supplied), the fourth open/close valve 307 is opened, and the third, fifth and sixth open/close valves 306, 308 and 309 are closed (when water is circulated, a circulation state is again restored).

14) When the water in the cold water supply tank 301, the auxiliary cold water supply tank 301' and the hot water supply tank 302 is drained, the respective drain valves 361 are opened. At this time, the cold water open/close valve 241, the second, fourth and fifth open/close valves 305, 307 and 308 and the hot water open/close valve 251 are closed, and the first, sixth and seventh open/close valves 304, 309 and 310 are opened so that the water in the storage tank 200, the cold water supply tank 301, the auxiliary cold water supply tank 301' and the hot water supply tank 302 is drained through the drain pipe 351 (here, the path along which the water is flowed from the drain pipe 351 to the fifth auxiliary connection pipe 731 is interrupted).

15) When water is circulated by operation of the pump 400, the main valve 811 is closed so that tap water is not flowed. At this time, the water is circulated in one direction through the backwater valve 821.

16) The sterilizer 900 (a UV sterilizer, a far-infrared sterilizer, a silver nano sterilizer, an ozone sterilizer or a photocatalytic sterilizer) is installed to the first circulation pipe 500, the second circulation pipe 600 and the drain pipe 351 so that the water passing through the first circulation pipe 500, the second circulation pipe 600 and the drain pipe 351 is sterilized.

17) In the process 13), the pump 400 is operated three times per hour at daytime and six times per hour at nighttime depending on the amount of water drained through the cold and hot water outlets 311 and 321.

First Spring Water Supply Type (See FIG. 4)

The first spring water supply type shown in FIG. 4 has a structure in which purified spring water is directly supplied to the storage tank 200, so that water is flowed and circulated from the storage tank 200. In the first spring water supply type, the water level sensor 211 may not be provided to the storage tank 200, and a spring water tank containing spring water and the storage tank 200 may be formed closed. The processes of circulating water are identical to those in the first faucet direct-connection type, except a supply source of water.

That is, in the processes of the first faucet direct-connection type, the processes related to the main valve 811, the backwater valve 821, the faucet direct-connection pipe 800 the water level sensor of the storage tank 200 are omitted, and the circulation structure of water is started from the spring water container and the storage tank 200. The other processes of circulating water are identical to those in the first faucet direct-connection type.

Second Spring Water Supply Type (See FIG. 5)

The processes of circulating water are similar to those in the first spring water supply type, and the operational principle of the second faucet direct-connection type is identical to that in the second faucet direct-connection type, except connection of the drain pipe 351 extended from the cold water supply tank 301 and the hot water supply tank 302. That is, the connection structure of the drain pipe 351 in the second faucet direct-connection type is combined with the first spring water supply type.

That is, in the processes of the second faucet direct-connection type, the processes related to the main valve 811, the backwater valve 821, the faucet direct-connection pipe 800 the water level sensor of the storage tank 200 are omitted, and the circulation structure of water is started from the spring water container and the storage tank 200. The other processes of circulating water are identical to those in the second faucet direct-connection type.

First Air Collection Type (See FIG. 6)

In FIG. 6, the circulation type water purifier according to the embodiment of the present invention is applied to an air collection type and a faucet direct-connection type. The structure of the faucet direct-connection type is identical to that of the first faucet direct-connection type. The air collection type is further added to the faucet direct connection type, so that the faucet direct-connection type and the air collection type are used together as a supply source of water.

The principle of receiving water using the air collection type is as follows.

First, although not shown in detail, a fan electrically connected to the microcomputer MP rotates, external air flowed through an air filter is evaporated and frozen through an evaporator and a condenser so that water is stored in a water tank. The water in the water tank is flowed into the second circulation pipe 600, a sensor sensing a water level of water is installed in the water tank. If the water level of the water reaches a predetermined water level, the sensor electrically connected to the microcomputer is operated, and therefore, the pump is operated. Accordingly, the water in the water tank is pumped and then flowed into the second circulation pipe 600 along a connection pipe. At this time, the water drained from the compressor and the evaporator is flowed into the second circulation pipe 600 via the sterilizer 900. The air collection type is a related art but used to show a use state of the circulation type water purifier according to the embodiment of the present invention. The air collection type is briefly shown and described to show that it is applied to the first air collection type. Preferably, the sterilizer 900 is installed to the connection pipe through which the water is flowed into the water tank through the evaporator. The water in the water tank is circulated to have the same circulation period of water in the water purifier.

Second Air Collection Type (See FIG. 7)

The second air collection type is identical to the first air collection type but is configured using the method of the second faucet direct-connection type.

That is, a fan electrically connected to the microcomputer MP rotates, external air flowed through an air filter is evaporated and frozen through an evaporator and a condenser so that water is stored in a water tank. The water in the water tank is flowed into the second circulation pipe 600, a sensor sensing a water level of water is installed in the water tank. If the water level of the water reaches a predetermined water level, the sensor electrically connected to the microcomputer is operated, and therefore, the pump is operated. Accordingly, the water in the water tank is pumped and then flowed into the second circulation pipe 600 along a connection pipe. At this time, the water drained from the compressor and the evaporator is flowed into the second circulation pipe 600 via the sterilizer 900. The air collection type is a related art but used to show a use state of the circulation type water purifier according to the embodiment of the present invention. The air collection type is briefly shown and described to show that it is applied to the second air collection type. Preferably, the sterilizer 900 is installed to the connection pipe through which the water is flowed into the water tank through the evaporator. The water in the water tank is circulated to have the same circulation period of water in the water purifier.

The water flowed into the second circulation pipe 600 from the water tank is circulated through processes identical to those in the second faucet direct-connection type.

Third Air Collection Type (See FIG. 8)

In the third air collection type, the first air collection type is combined with the first spring water supply type.

That is, a fan electrically connected to the microcomputer MP rotates, external air flowed through an air filter is evaporated and frozen through an evaporator and a condenser so that water is stored in a water tank. The water in the water tank is flowed into the second circulation pipe 600, a sensor sensing a water level of water is installed in the water tank. If the water level of the water reaches a predetermined water level, the sensor electrically connected to the microcomputer is operated, and therefore, the pump is operated. Accordingly, the water in the water tank is pumped and then flowed into the second circulation pipe 600 along a connection pipe. At this time, the water drained from the compressor and the evaporator is flowed into the second circulation pipe 600 via the sterilizer 900. The air collection type is a related art but used to show a use state of the circulation type water purifier according to the embodiment of the present invention. The air collection type is briefly shown and described to show that it is applied to the third air collection type. Preferably, the sterilizer 900 is installed to the connection pipe through which the water is flowed into the water tank through the evaporator. The water in the water tank is circulated to have the same circulation period of water in the water purifier.

The water flowed into the second circulation pipe 600 from the water tank is circulated through processes identical to those of the first spring water supply type. In the spring water supply type, the water level sensor may not be provided to the storage tank 200. Preferably, the spring water container containing spring water and the storage tank 200 are formed closed. The processes of circulating water are identical to those in the first faucet direct-connection type, except a supply source of water.

That is, in the processes of the first faucet direct-connection type, the processes related to the main valve 811, the backwater valve 821, the faucet direct-connection pipe 800 the water level sensor of the storage tank 200 are omitted, and the circulation structure of water is started from the spring water container and the storage tank 200. The other processes of circulating water are identical to those in the first faucet direct-connection type.

Fourth Air Collection Type (See FIG. 9)

The fourth air collection type is identical to the first air collection type but is configured using the method of the second faucet direct-connection type.

That is, a fan electrically connected to the microcomputer MP rotates, external air flowed through an air filter is evaporated and frozen through an evaporator and a condenser so that water is stored in a water tank. The water in the water tank is flowed into the second circulation pipe 600, a sensor sensing a water level of water is installed in the water tank. If the water level of the water reaches a predetermined water level, the sensor electrically connected to the microcomputer is operated, and therefore, the pump is operated. Accordingly, the water in the water tank is pumped and then flowed into the second circulation pipe 600 along a connection pipe. At this time, the water drained from the compressor and the evaporator is flowed into the second circulation pipe 600 via the sterilizer 900. The air collection type is a related art but used to show a use state of the circulation type water purifier according to the embodiment of the present invention. The air collection type is briefly shown and described to show that it is applied to the third air collection type. Preferably, the sterilizer 900 is installed to the connection pipe through which the water is flowed into the water tank through the evaporator. The water in the water tank is circulated to have the same circulation period of water in the water purifier.

The water flowed into the second circulation pipe 600 from the water tank is circulated through the processes of the second spring water supply type. In the second faucet direct connection type, the connection structure of the drain pipe 351 is combined with the first spring water supply type. That is, in the processes of the second faucet direct-connection type, the processes related to the main valve 811, the backwater valve 821, the faucet direct-connection pipe 800 the water level sensor of the storage tank 200 are omitted, and the circulation structure of water is started from the spring water container and the storage tank 200. The other processes of circulating water are identical to those in the first faucet direct-connection type.

Second Embodiment

As shown in FIG. 13, the second embodiment has a structure in which the third and fifth open/close valves 306 and 308 and the second auxiliary water supply connection pipe 233 are omitted in the configuration of the first embodiment.

Therefore, the circulation structure of water when the water in the cold water supply tank 301 and the auxiliary cold water supply tank 301' is alternately circulated is different from that when cooled water is drained (in the following description, only the valves 306 and 308 and the connection pipe 233 are omitted for convenience of illustration).

That is, when the water in the cold water supply tank 301 is circulated, the second and seventh open/close valves 305 and 310 and the cold water open/close valve 241 are opened, and the fourth and sixth open/close valves 307 and 309 are closed, as shown in FIG. 15.

When the water in the auxiliary cold water supply tank 301' is circulated, the fourth and sixth open/close valves 307 and 309 and the cold water open/close valve 241 are opened, and the second and seventh open/close valves 306 and 310 are closed, as shown in FIG. 14.

First Faucet Direct-Connection Type (See FIG. 13)

1) Water is flowed into the second circulation pipe 600 through the faucet direct-connection pipe 800.

2) The flowed water is flowed into the clean water filter 100.

3) The water filtered by the clean water filter 100 is flowed into the storage tank 200 along the first circulation pipe 500.

4) The water in the storage tank 200 is flowed into the cold water supply tank 301, the auxiliary cold water supply tank 301' and the hot water supply tank 302 along the first auxiliary connection pipes 231a and 231b and the second auxiliary connection pipe 235.

5) The water in the cold water supply tank 301, the auxiliary cold water supply tank 301' and the hot water supply tank 302 is drained through the cold and hot water outlets 311 and 321 so as to supply drinking water.

6) The sensors 331 and 341 sense information on the drinking water and transfer the sensed information to the microcomputer MP.

7) The water in the cold water supply tank 301, the auxiliary cold water supply tank 301' and the hot water supply tank 302 is flowed into the second circulation pipe 600 along the drain pipe 351, the fifth auxiliary connection pipe 731, the third auxiliary connection pipe 711 and the fourth auxiliary connection pipe 721.

8) The water flowed into the second circulation pipe 600 is again flowed into the clean water filter 100.

9) The processes 1) to 8) form a circulation path before the pump 400 is operated. When the pump 400 is operated, the storage tank valve 221 installed in the second circulation pipe 600 is opened in the process 7), and the water in the storage tank 200 is flowed into the first auxiliary connection pipes 231a and 231b, the second auxiliary connection pipe 235 and the second circulation pipe 600.

10) First, when water in the cold water supply tank 301 is circulated, the pump 400 is operated, and the water is circulated sequentially through the second circulation pipe 600, the clean water filter 100, the first circulation pipe 500, the storage tank 200, the first and second auxiliary connection pipes 231b and 235 and the second circulation pipe 600. The water flowed from the storage tank 200 to the first and second auxiliary connection pipes 231b and 235 is periodically circulated per predetermined time as follows:

① the first auxiliary connection pipe 231b→the cold water supply tank 301→the drain pipe 351 and the cold water outlet 311, connected to the cold water supply tank 301→the third auxiliary connection pipe 711→the second circulation pipe 600.

② the second auxiliary connection pipe 235→the drain pipe 351 and the fourth and fifth auxiliary connection pipes 721 and 731, connected to the hot water supply tank 302→the second circulation pipe 600.

In ① and ②, the water flowed into the second circulation pipe 600 is again flowed into the clean water filter and periodically circulated per predetermined time.

11) Next, when water in the auxiliary cold water supply tank 301' is circulated, the pump 400 is operated, and the water is circulated sequentially through the second circulation pipe 600, the clean water filter 100, the first circulation pipe 500, the storage tank 200, the first and second auxiliary connection pipes 231a and 235 and the second circulation pipe 600. The water flowed from the storage tank 200 to the first and second auxiliary connection pipes 231a and 235 is periodically circulated per predetermined time as follows:

① the first auxiliary connection pipe 231→the auxiliary cold water supply tank 301'→the drain pipe 351 and the first auxiliary water supply connection pipe 232, connected to the auxiliary cold water supply tank 301→the second auxiliary water supply connection pipe 233→the cold water outlet 311→the third auxiliary connection pipe 711→the second circulation pipe 600

② the second auxiliary connection pipe 235→the drain pipe 351 and the fourth and fifth auxiliary connection pipes 721 and 731, connected to the hot water supply tank 302→the second circulation pipe 600.

12) In ① and ②, the water flowed into the second circulation pipe 600 is again flowed into the clean water filter 100 and periodically circulated per predetermined time. The water in the cold water supply tank 301, the auxiliary cold water supply tank 301' and the hot water supply tank 302 is drained through the cold and hot water outlets so as to supply drinking water.

13) The sensors 331 and 341 sense information on the drinking water and transfer the sensed information to the microcomputer MP. When the water in the cold water supply tank 301 and the auxiliary cold water supply tank 301' is drained in circulation of the water in the water purifier, the microcomputer MP senses the drainage and temporarily stops the circulation of water. When the water in the cold water supply tank 301 is drained (supplied) to supply cool drinking water, the second open/close valve 305 is opened, and the fourth and seventh open/close valves 307 and 310 and the cold water open/close valve 311 are closed. When the water in the auxiliary cold water supply tank 301' is drained (supplied), the fourth open/close valve 307 is opened, and the second and sixth open/close valves 305 and 309 and the cold water open/close valve 311 are closed (when water is circulated, a circulation state is again restored).

14) When the water in the cold water supply tank 301, the auxiliary cold water supply tank 301' and the hot water supply tank 302 is drained, the respective drain valves 361 are opened. At this time, the second and fourth open/close valves 305 and 307 and the hot water open/close valve 251 are closed, and the first, sixth and seventh open/close valves 304, 309 and 310 are opened so that the water in the storage tank 200, the cold water supply tank 301, the auxiliary cold water supply tank 301' and the hot water supply tank 302 is drained through the drain pipe 351 (here, the path along which the water is flowed from the drain pipe 351 to the fifth auxiliary connection pipe 731 is interrupted).

15) When water is circulated by operation of the pump 400, the main valve 811 is closed so that tap water is not flowed. At this time, the water is circulated in one direction through the backwater valve 821.

16) The sterilizer 900 (a UV sterilizer, a far-infrared sterilizer, a silver nano sterilizer, an ozone sterilizer or a photocatalytic sterilizer) is installed to the first circulation pipe 500, the second circulation pipe 600 and the drain pipe 351 so that the water passing through the first circulation pipe 500, the second circulation pipe 600 and the drain pipe 351 is sterilized.

17) In the process 13), the pump 400 is operated three times per hour at daytime and six times per hour at nighttime depending on the amount of water drained through the cold and hot water outlets 311 and 321.

That is, the processes 11), 13) and 14) in the second embodiment are different from those of the first faucet direct-connection type in the first embodiment.

In the second embodiment, the structure of the connection pipes connected the storage tank 200, the cold water supply tank 301 and the auxiliary cold water supply tank 301' are briefly configured as compared with that in the first embodiment. Therefore, the circulation structure and operational principle of water are similar to those in the first embodiment. In the second embodiment, the first faucet direct-connection type is used as an example. The processes 11), 13) and 14) in the second embodiment are different from those of the first faucet direct-connection type in the first embodiment. The operational principles and circulation structures of the first and second spring water supply types and the first, second, third and fourth air collection types in the first embodiment are also applied to the structure in the second embodiment. Therefore, their additional descriptions will be omitted.

A circulation type water purifier according to the present invention has a structure in which the cold water supply tank 301 and the auxiliary cold water supply tank 301' are installed together so that water in the cold water supply tank 301 and the auxiliary cold water supply tank 301' is alternately circulated. To drain the water in the cold water supply tank 301 and the auxiliary cold water supply tank 301', the type and number of connection pipes and valves may be varied depending on a user. The first and second embodiments are provided only for illustrative purposes.

Description was made in detail with reference to example embodiments. However, it will be appreciated by those skilled in the art that changes may be made in these embodiments without departing from the principles and spirit of the present invention, the scope of which is defined in the accompanying claims and their equivalents.

The invention claimed is:
1. A circulation type water purifier comprising:
a clean water filter (100);
a storage tank (200) in which water purified through the clean water filter (100) is stored;
a cold/hot water supply tank (300) cooling and heating the water supplied from the storage tank (200) to drain the cooled and heated water to respective drain outlets;
a drain pipe (351) connected to the cold/hot water supply tank (300) to drain the water in the cold/hot water supply tank (300) when cleansing the interior of the cold/hot water supply tank (300);
a pump (400) periodically circulating water at every circulation time under a control of a microcomputer;
a circulation pipe connecting the clean water filter (100), the storage tank (200), the cold/hot water supply tank (300), the drain pipe (351) and the pump (400), the circulation pipe comprising a first circulation pipe (500) connecting the clean water filter (100) and the storage tank (200), a first auxiliary circulation pipe (230) connecting the storage tank (299) and the cold/hot water supply tank (300), a second circulation pipe (600) connecting the storage tank (200) and the clean water filter (100), and a second auxiliary circulation pipe (700) connecting the cold/hot water supply tank (300) and the second circulation pipe (600), the second auxiliary circulation pipe 700 comprising a third auxiliary connection pipe 711 connecting a cold water outlet 311 and the second circulation pipe 600, a fourth auxiliary connection pipe 721 connecting a hot water outlet 321 and the second circulation pipe 600, and a fifth auxiliary connection pipe 731 connecting the drain pipe 351 and the second circulation pipe 600; and
a sterilizer (900) installed to the circulation pipe to sterilize water flowed into the circulation pipe.

2. The circulation type water purifier according to claim 1, wherein the storage tank (200) further comprises a water level sensor (211), and the water level sensor (211) interrupts the supply of water into the storage tank (200) when the water in the storage tank (200) reaches a predetermined water level.

3. The circulation type water purifier according to claim 1, wherein the cold/hot water supply tank (300) further comprises:
a cold water supply tank (301) cooling the water supplied from the storage tank (200) and then draining the cooled water to the cold water outlet (311);
a hot water supply tank (302) heating the water supplied from the storage tank (200) and then draining the heated water to the hot water outlet (321); and
sensors (331, 341) sensing an amount of water drained through each of the cold and hot water outlets (311, 321) of the cold/hot water supply tank (300).

4. The circulation type water purifier according to claim 3, wherein the cold water supply tank (300) further comprises an auxiliary cold water supply tank (301') so that the water in the cold water supply tank (301) and the auxiliary cold water supply tank (301') is alternately circulated.

5. The circulation type water purifier according to claim 1, wherein the pump (400) is operated at least once to 36 times for three hours.

6. The circulation type water purifier according to claim 1, wherein the sterilizer (900) includes any one of a UV sterilizer, a far-infrared sterilizer, a silver nano sterilizer, an ozone sterilizer and a photocatalytic sterilizer, and at least one or more sterilizers are installed to the circulation pipe and the drain pipe (351) so that water passing through the circulation pipe and the drain pipe (351) is sterilized.

7. The circulation type water purifier according to claim 1, wherein the interiors of the storage tank (200), the cold/hot water supply tank (300), the circulation pipe and the drain pipe (351) are coated with an antibiotic material made of any one of silver, carbon, copper, stainless steel and titanium dioxide or a mixture comprising two or more of them.

* * * * *